(12) United States Patent
Vasylyev

(10) Patent No.: US 11,668,868 B2
(45) Date of Patent: Jun. 6, 2023

(54) STEPPED LIGHT GUIDE ILLUMINATION SYSTEMS

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 0 days.

(21) Appl. No.: 17/161,662

(22) Filed: Jan. 29, 2021

(65) Prior Publication Data

US 2021/0181404 A1 Jun. 17, 2021

Related U.S. Application Data

(62) Division of application No. 16/826,234, filed on Mar. 22, 2020, now Pat. No. 10,908,350, which is a division of application No. 15/996,865, filed on Jun. 4, 2018, now Pat. No. 10,605,980.

(60) Provisional application No. 62/514,946, filed on Jun. 4, 2017.

(51) Int. Cl.
F21V 8/00 (2006.01)

(52) U.S. Cl.
CPC ......... *G02B 6/0076* (2013.01); *G02B 6/0038* (2013.01); *G02B 6/0068* (2013.01); *G02B 6/0073* (2013.01); *G02B 6/0078* (2013.01); *G02B 6/0091* (2013.01); *F21V 2200/20* (2015.01); *G02B 6/0021* (2013.01)

(58) Field of Classification Search
CPC .. G02B 6/0021; G02B 6/0091; G02B 6/0075; G02B 6/0076
See application file for complete search history.

(56) References Cited

U.S. PATENT DOCUMENTS

| | | | |
|---|---|---|---|
| 4,714,983 A | 12/1987 | Lang | |
| 6,241,358 B1 | 6/2001 | Higuchi et al. | |
| 6,292,157 B1 | 9/2001 | Greene et al. | |
| 6,580,477 B1 | 6/2003 | Cho | |
| 6,979,112 B2 | 12/2005 | Yu et al. | |
| 7,311,431 B2 | 12/2007 | Chew et al. | |
| 7,358,929 B2 | 4/2008 | Mueller et al. | |
| 7,458,709 B2 | 12/2008 | Lang et al. | |
| 8,092,064 B2 | 1/2012 | Erchak et al. | |
| 8,130,347 B2 | 3/2012 | Mager et al. | |
| 8,159,629 B2 | 4/2012 | Yamashita et al. | |
| 8,172,444 B2 | 5/2012 | Chan et al. | |
| 8,330,708 B2 | 12/2012 | Park et al. | |
| 8,350,800 B2 | 1/2013 | An et al. | |
| 2003/0206253 A1 | 11/2003 | Cho | |

(Continued)

*Primary Examiner* — Mariceli Santiago

(57) ABSTRACT

A stepped light guide illumination system employing a planar sheet of an optically transmissive material having a stepped light guiding structure including one or more parallel arrays of channels. Light is input into the stepped light guiding structure using a number of side-emitting LED sources located within the channels and coupled to the stepped light guiding structure at multiple locations. The LED sources are mounted to a printed circuit board extending along one or more channels and having a width which is greater than a width of the respective channel. Light is extracted from the stepped light guiding structure using a two-dimensional pattern of light extraction features formed in a surface of the planar sheet.

20 Claims, 18 Drawing Sheets

(56) References Cited

U.S. PATENT DOCUMENTS

| | | |
|---|---|---|
| 2004/0114396 A1 | 6/2004 | Kobayashi et al. |
| 2004/0165372 A1 | 8/2004 | Parker |
| 2005/0040424 A1 | 2/2005 | Erchak et al. |
| 2005/0135115 A1 | 6/2005 | Lamb et al. |
| 2006/0083021 A1 | 4/2006 | Jeong et al. |
| 2006/0245213 A1 | 11/2006 | Beil et al. |
| 2007/0045640 A1 | 3/2007 | Erchak et al. |
| 2007/0211183 A1 | 9/2007 | Erchak et al. |
| 2007/0236959 A1 | 10/2007 | Tolbert et al. |
| 2007/0247871 A1 | 10/2007 | Yoo |
| 2008/0205078 A1 | 8/2008 | Karlicek et al. |
| 2009/0067192 A1 | 3/2009 | Hsieh et al. |
| 2009/0303410 A1 | 12/2009 | Murata et al. |
| 2010/0026931 A1 | 2/2010 | Yokoyama |
| 2010/0109567 A1 | 5/2010 | Deurenberg et al. |
| 2010/0214508 A1 | 8/2010 | Ouchi et al. |
| 2010/0232141 A1 | 9/2010 | Kim |
| 2010/0259470 A1 | 10/2010 | Kohtoku et al. |
| 2010/0296026 A1 | 11/2010 | Kubota et al. |
| 2010/0302290 A1 | 12/2010 | Muschaweck |
| 2010/0302805 A1 | 12/2010 | Jeong et al. |
| 2011/0013376 A1* | 1/2011 | Kim .................... G02B 6/0021 362/97.1 |
| 2011/0025724 A1 | 2/2011 | Hur et al. |
| 2011/0026269 A1 | 2/2011 | Oh |
| 2012/0300135 A1* | 11/2012 | Cho .................. G02F 1/133615 362/612 |
| 2013/0039036 A1 | 2/2013 | Son et al. |
| 2014/0056028 A1 | 2/2014 | Nichol et al. |
| 2014/0071711 A1* | 3/2014 | Boulais ................ G02B 6/0073 362/613 |
| 2014/0098563 A1 | 4/2014 | Kim et al. |
| 2015/0226988 A1 | 8/2015 | Chen et al. |

\* cited by examiner

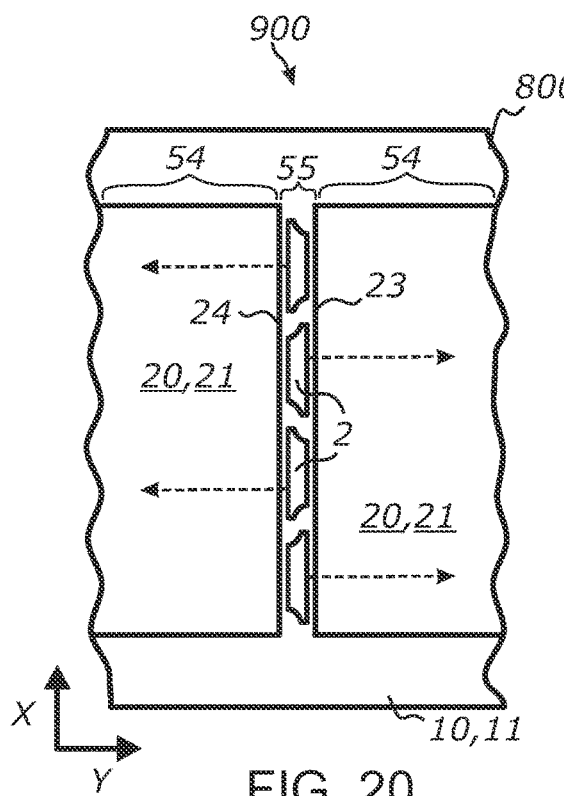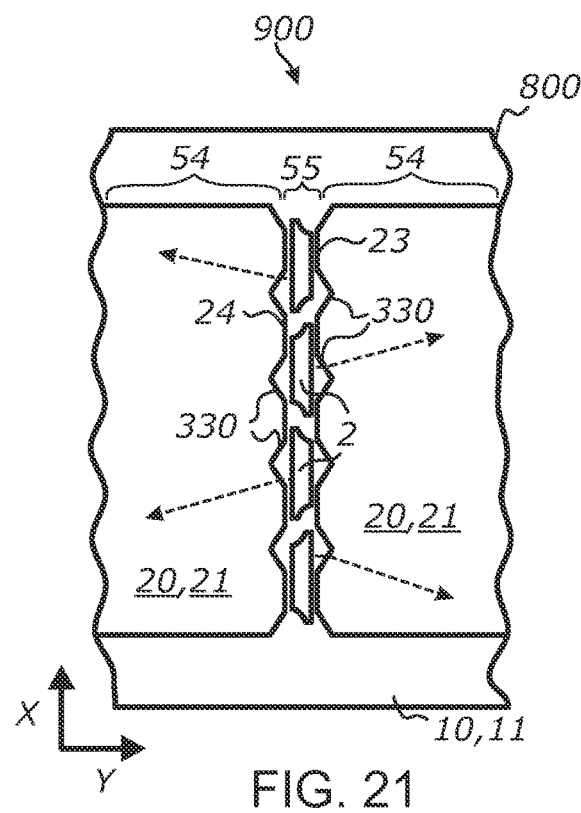
FIG. 20
FIG. 21
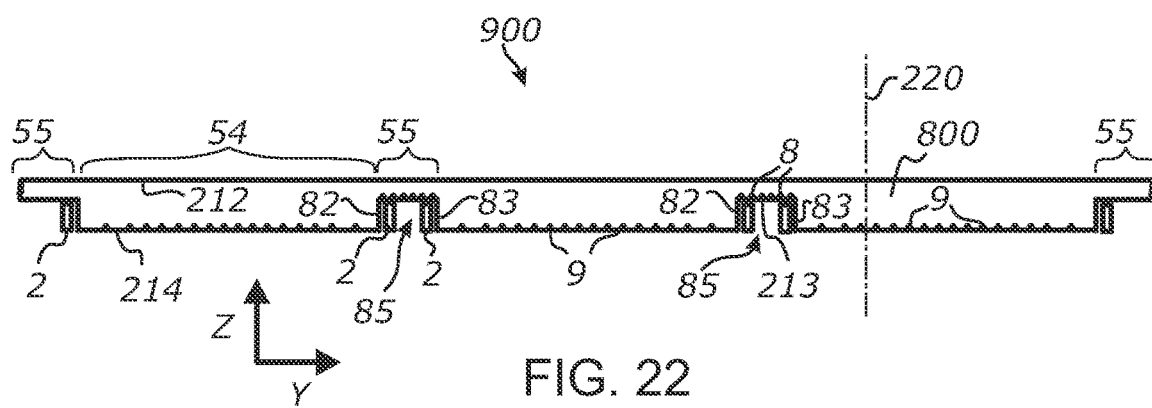
FIG. 22

STEPPED LIGHT GUIDE ILLUMINATION SYSTEMS

CROSS-REFERENCE TO RELATED APPLICATIONS

This application is a division of application Ser. No. 16/826,234 filed on Mar. 22, 2020, which is a division of application Ser. No. 15/996,865 filed on Jun. 4, 2018, which claims priority to U.S. provisional application Ser. No. 62/514,946 filed on Jun. 4, 2017, the disclosure of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to illumination devices employing planar light guides. More particularly, this invention relates to wide-area luminaires, lighting panels, illuminated panel signs, front lights, backlights, backlighting units, electronic displays, backlit display screens, advertising displays, road signs, decorative broad-area lights, as well as to a method for redistributing light from discrete light sources in such devices.

2. Description of Background Art

Conventionally, wide-area light emitting devices employ planar light guides, also commonly referred to as "waveguides", which are illuminated from one or more edges using Light Emitting Diodes (LEDs) or other types of compact light sources. The conventional edge-lit illumination systems may exhibit certain limitations such as difficulty to efficiently couple enough light into edges to provide sufficient light output from a relatively large area of the light guide. Additionally, guiding light long distances from light input edges is associated with optical losses in the light guide material which may lead to energy waste and suboptimal performance of the illumination device.

U.S. Patent Applications Publications No. US-2014-0226361-A1 (the '361 Publication) and US-2017-0045666-A1 (the '666 Publication), the disclosure of which is incorporated herein by reference in its entirety, disclose face-lit waveguide illumination systems formed by a planar waveguide and optical coupling elements attached to a face of the waveguide. U.S. Pat. No. 9,097,826 (the '826 Patent) the disclosure of which is incorporated herein by reference in its entirety, discloses illumination systems employing a planar light guide having cylindrical lenses formed in a broad-area light output surface of the planar light guide and extending perpendicular to a light input edge. U.S. Pat. No. 9,256,007 (the '007 Patent), the disclosure of which is incorporated herein by reference in its entirety, discloses illumination systems employing planar light guides associated with lens arrays, including arrays of cylindrical lenses and the like.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

According to one embodiment, a stepped light guide illumination system is exemplified by a first sheet of an optically transmissive material, a plurality of smaller-area second sheets of an optically transmissive material attached to a broad-area surface of the first sheet, a first plurality of light extraction features formed in a surface of the first sheet, a second plurality of light extraction features formed in a surface of the second sheet, and a plurality of light sources optically coupled to a light input edge of at least one of the plurality of the second sheets. A broad-area surface of the first sheet may include a plurality of lenses extending perpendicular to the light input edge.

According to one embodiment, a stepped light guide illumination system is exemplified by a sheet of an optically transmissive material having a plurality of channels formed in a broad-area surface of the sheet, a plurality of light extraction features formed in that or opposite surface of the sheet and defining edges extending perpendicular to the plane of the sheet, and a plurality of light sources located within one or more of the plurality of channels and optically coupled to the edges. According to different implementations, the channels may be arranged into a parallel array or two or more parallel arrays crossed at an angle with respect to each other. Bottom portions of the channels may include a plurality of light extraction features. A broad-area surface of the sheet may include a plurality of lenses extending perpendicular or parallel to the channels.

According to different implementations, the light sources may include light emitting diodes (LEDs), lasers or other types of compact light sources. The light extraction features may be formed by discrete microstructures distributed over an area according to a predefined two-dimensional pattern and configured for extracting light from the stepped light guide illumination system. A sheet of reflective material may be positioned on one side of the sheet of an optically transmissive material.

According to one embodiment, a method of making a stepped light guide illumination system consistent with the present invention, includes providing a large-area sheet of an optically transmissive material, cutting a series of parallel channels in the sheet, forming a plurality of light extraction features in a surface of the sheet, and positioning a plurality of LEDs within the channels. The method may further include positioning a reflective sheet on one side of the sheet of an optically transmissive material.

According to one embodiment, a method of making a stepped light guide illumination system consistent with the present invention, includes providing a first sheet of an optically transmissive material, attaching a plurality of smaller-area second sheets of an optically transmissive material to a broad-area surface of the first sheet, forming a plurality of light extraction features in a surface of the first and second sheets, positioning a plurality of LEDs within spaces between individual second sheets the channels, and attaching a reflective sheet to surfaces of the second sheets.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 8:
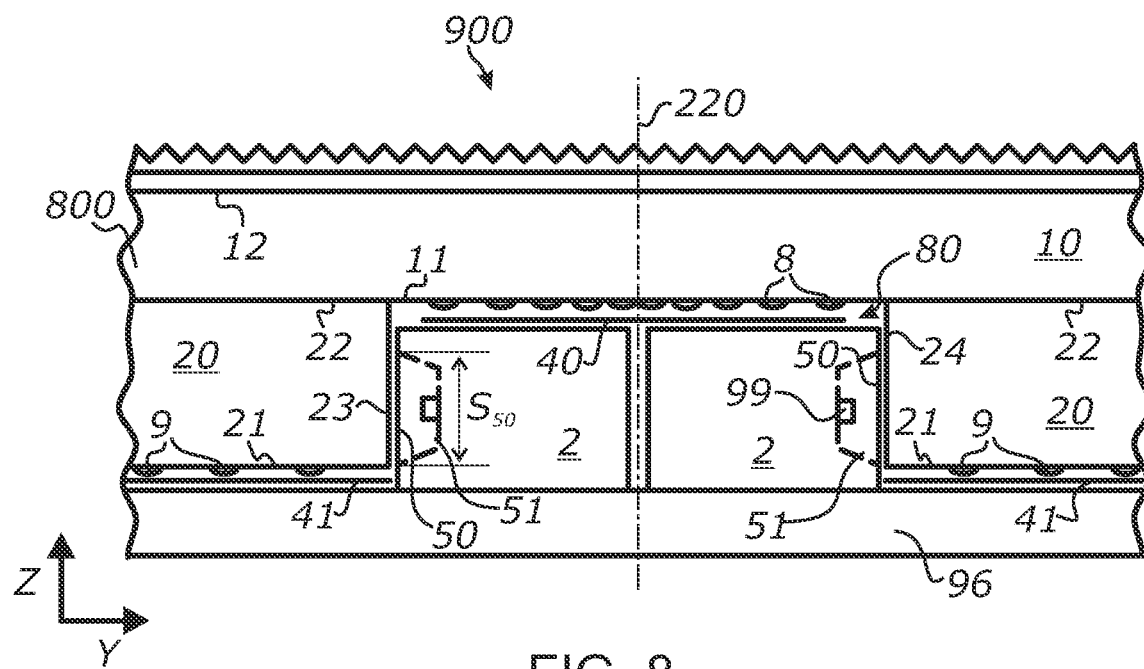

FIG. 8 is a schematic section view of portion of a stepped light guide illumination system, showing side-emitting LEDs optically coupled to edge surfaces of optically transmissive sheets and further showing light extraction features formed on a surface of a base light guiding sheet and on surfaces of light guiding sheets that are attached to the base sheet, according to at least one embodiment of the present invention.

Figure 9:
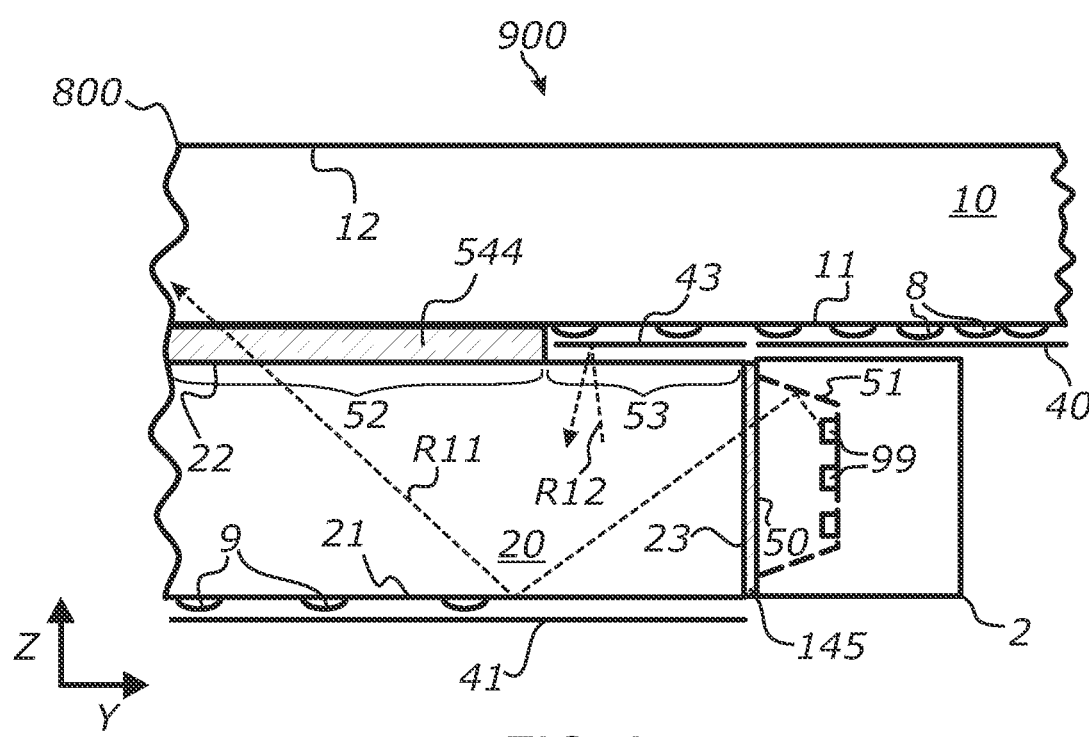

FIG. 9 is a schematic section view and raytracing of portion of a stepped light guide illumination system, showing a multi-chip LED and multiple light coupling layers, according to at least one embodiment of the present invention.

Figure 10:
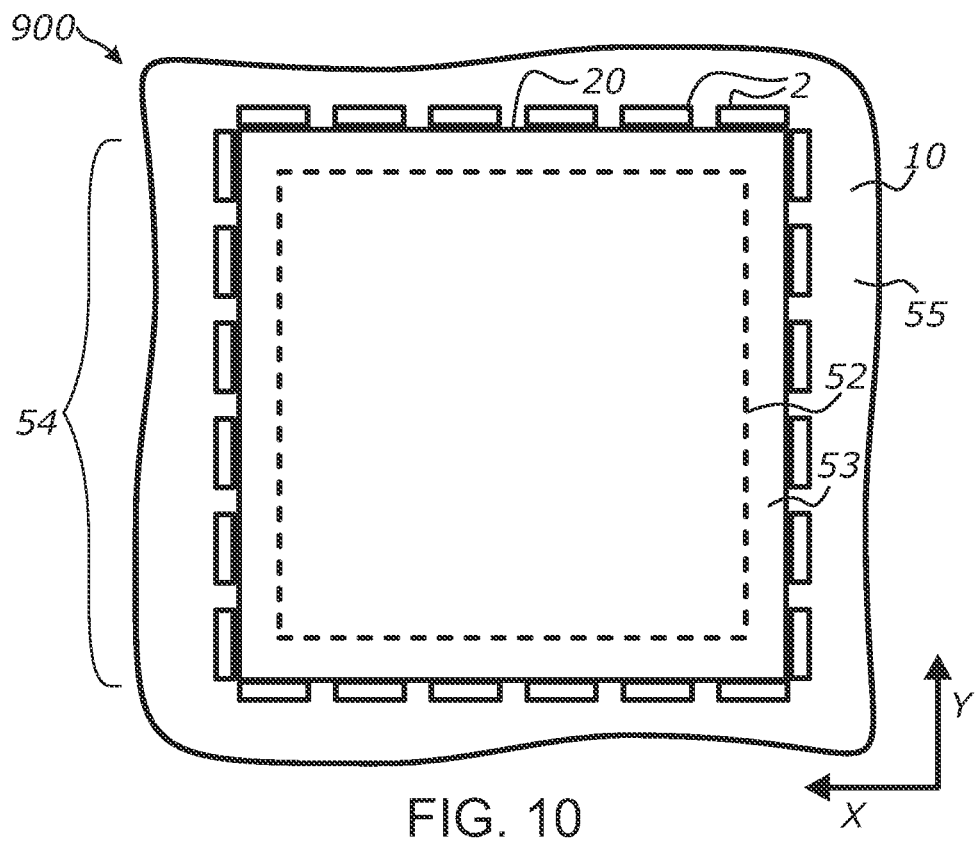

FIG. 10 is a schematic bottom view of a portion of a stepped light guide illumination system, illustrating an exemplary configuration of an area of optical contact between two planar light guiding sheets optically coupled to each other, according to at least one embodiment of the present invention.

Figure 11:
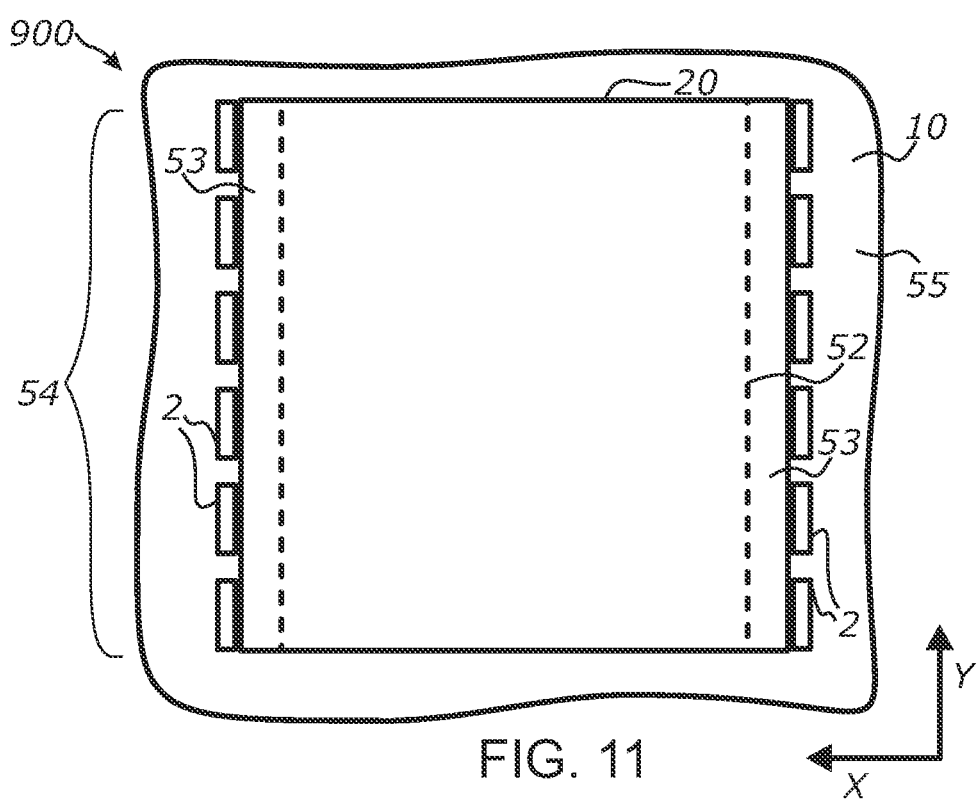

FIG. 11 is a schematic bottom view of a portion of a stepped light guide illumination system, illustrating an alternative exemplary configuration of an area of optical contact between two planar light guiding sheets optically coupled to each other, according to at least one embodiment of the present invention.

Figure 12:
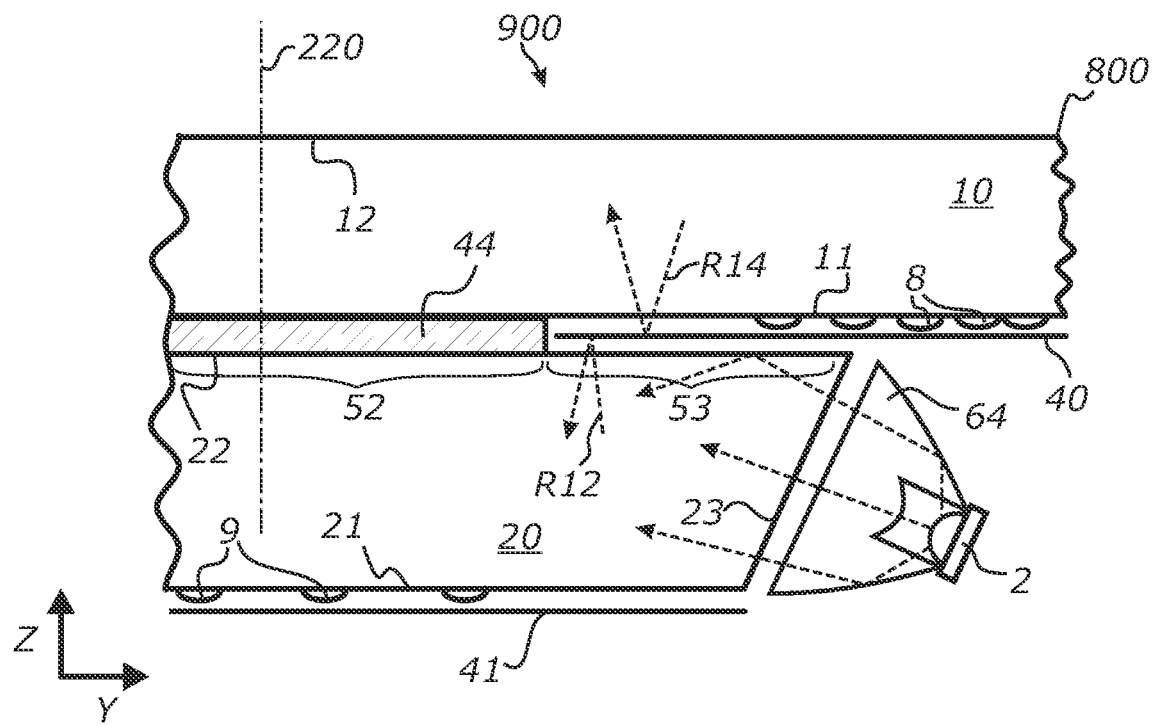

FIG. 12 is a schematic section view and raytracing of portion of a stepped light guide illumination system, showing a light input edge surface inclined an angle with respect to a normal to a prevalent plane of a stepped light guide and further showing a light collimating element associated with an LED source, according to at least one embodiment of the present invention.

Figure 13:
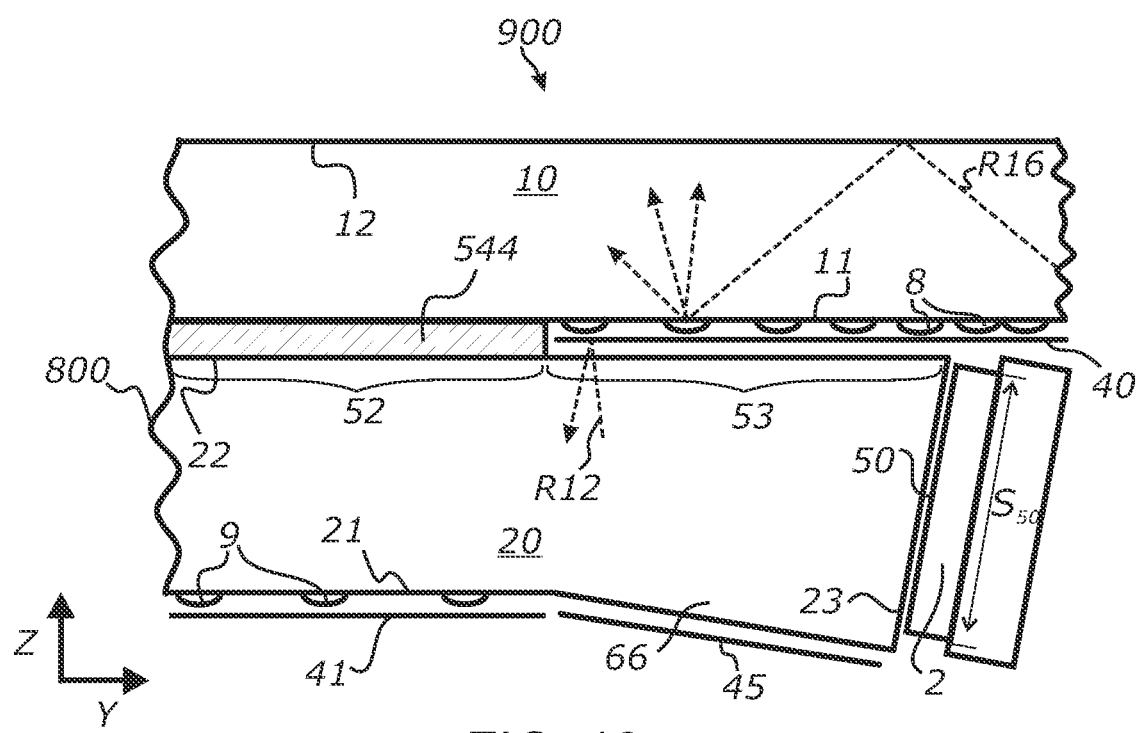

FIG. 13 is a schematic section view and raytracing of a portion of a stepped light guide illumination system, showing a tapered light input edge of a light guiding sheet that has a greater thickness than the rest of the light guiding sheet, according to at least one embodiment of the present invention.

Figure 14:
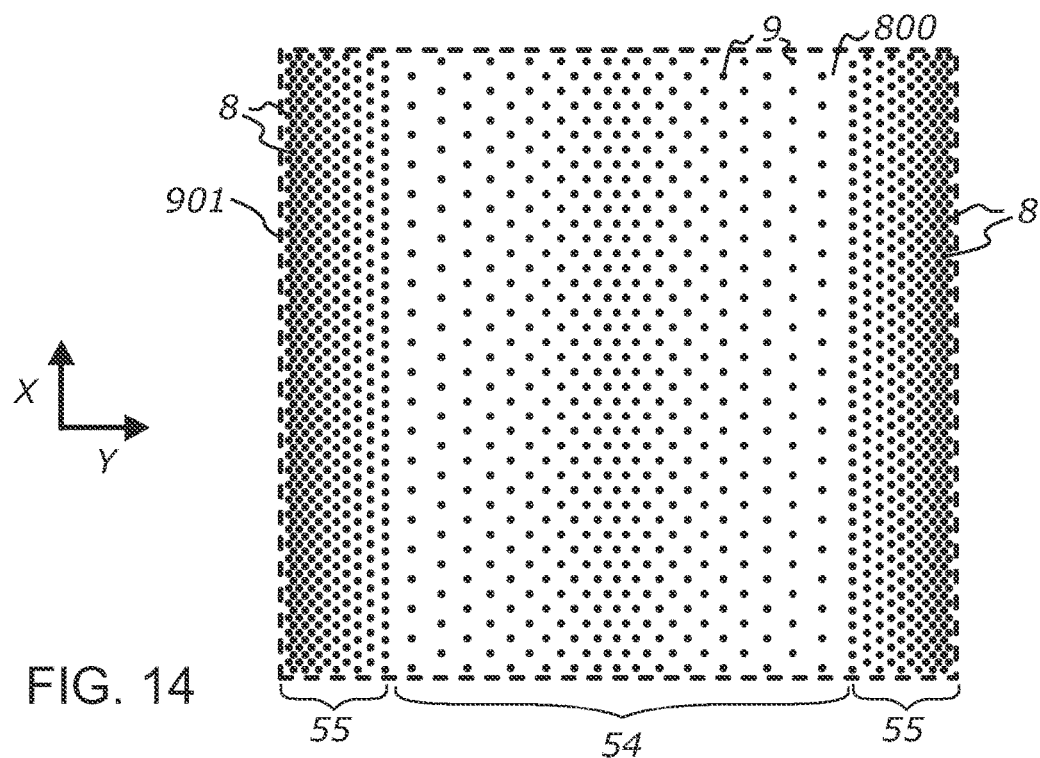

FIG. 14 is a schematic view showing an exemplary distribution pattern of light extraction elements for a portion of a stepped light guide illumination system, according to at least one embodiment of the present invention.

Figure 15:
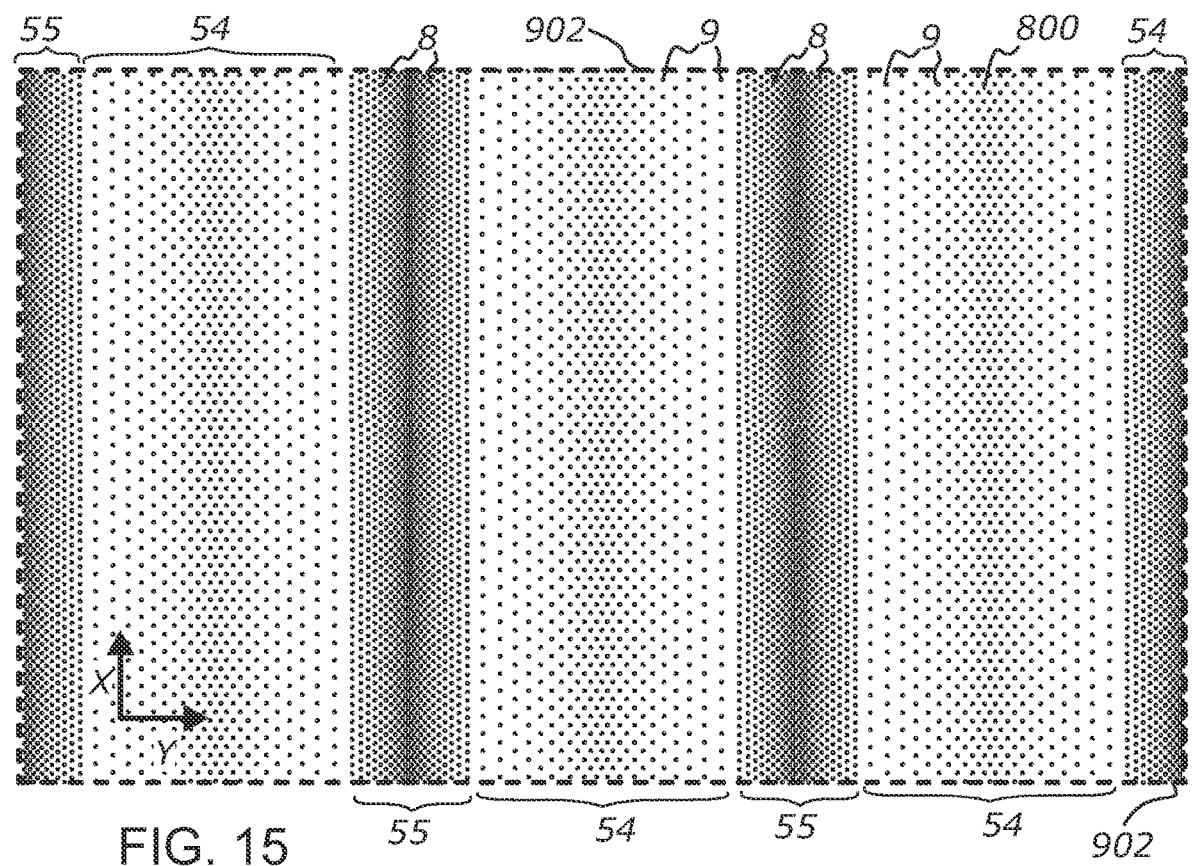

FIG. 15 is a schematic view showing an exemplary distribution pattern of light extraction elements for a larger portion of a stepped light guide illumination system including alternating areas having different surface densities of the light extraction elements, according to at least one embodiment of the present invention.

Figure 16:
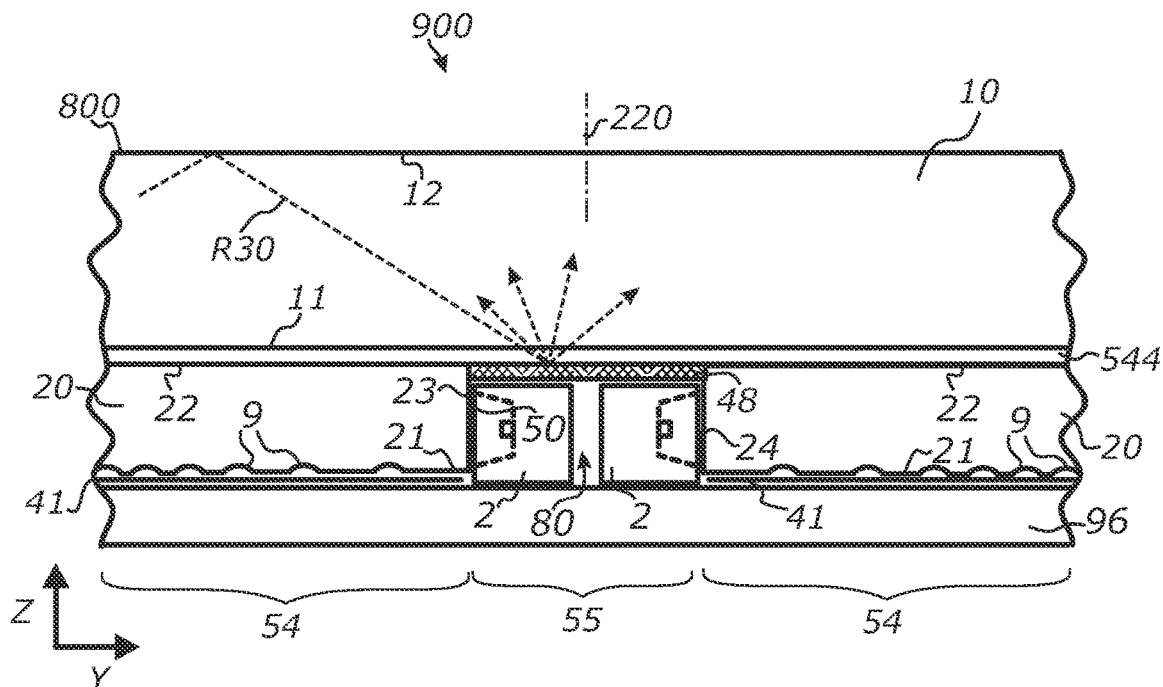

FIG. 16 is a schematic section view of a portion of a stepped light guide illumination system, showing a reflective light diffusing sheet coupled to a bottom surface of a top light guiding sheet, according to at least one embodiment of the present invention.

Figure 17:
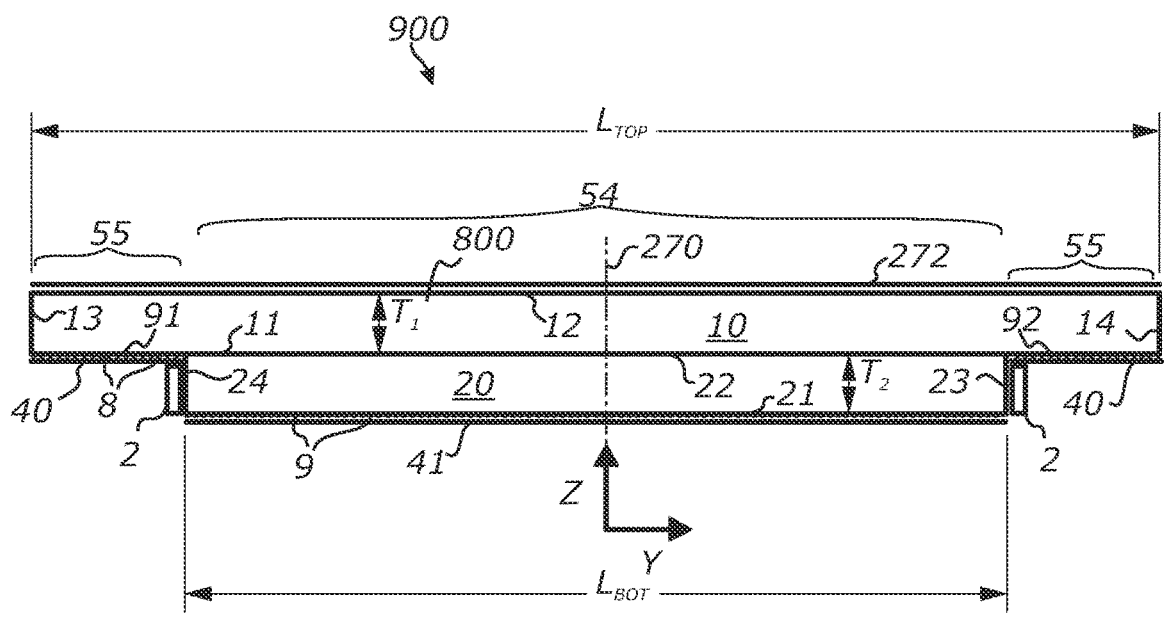

FIG. 17 is a schematic section view of an exemplary configuration of a stepped light guide illumination system selected for raytracing, according to at least one embodiment of the present invention.

Figure 18:
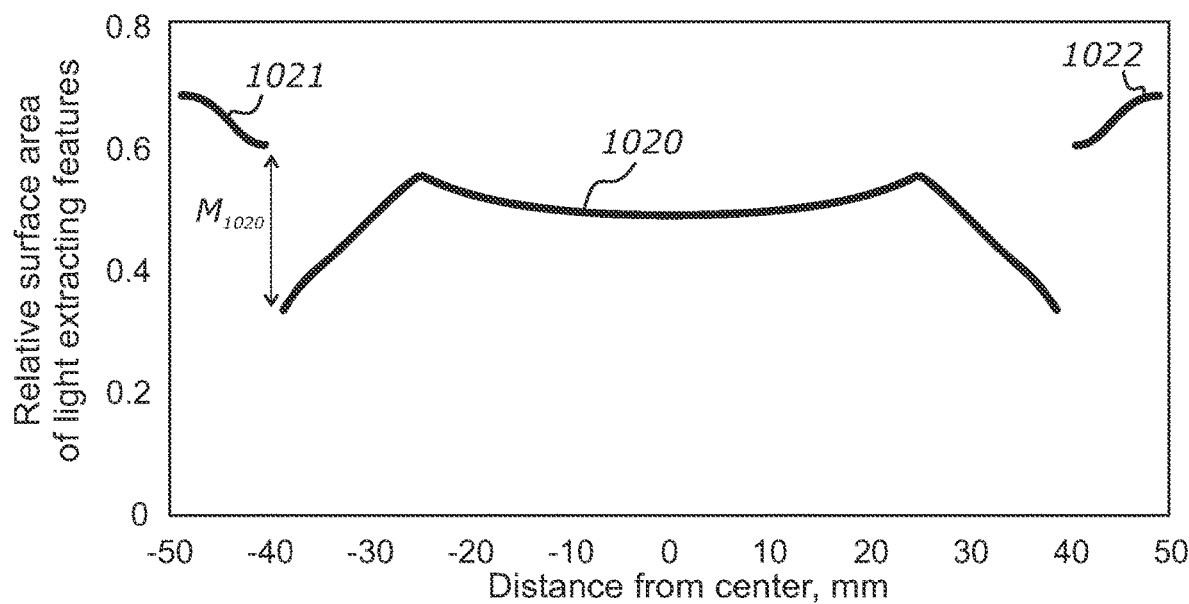

FIG. 18 is a graph showing exemplary dependencies of a relative surface area or surface density of light extraction features from a distance from a center of a stepped light guide.

Figure 19:
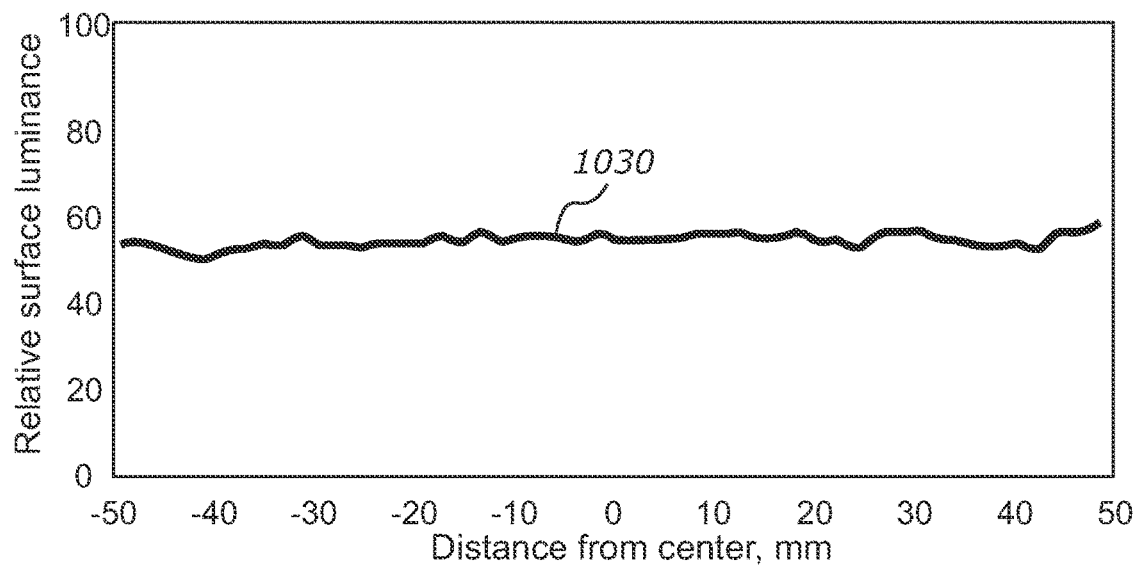

FIG. 19 is a graph showing exemplary calculated dependencies of a surface luminance from a distance from a center of a stepped light guide.

FIG. 20 is a schematic bottom view and raytracing of a portion of a stepped light guide illumination system, showing a single row of LEDs illuminating different light guiding sheets, according to at least one embodiment of the present invention.

FIG. 21 is a schematic bottom view and raytracing of a portion of a stepped light guide illumination system, showing corrugated light input edges of light guiding sheets, according to at least one embodiment of the present invention.

FIG. 22 is a schematic section view of a stepped light guide illumination system, showing a stepped light guide having a monolithic, single-piece body, according to at least one embodiment of the present invention.

Figure 23:
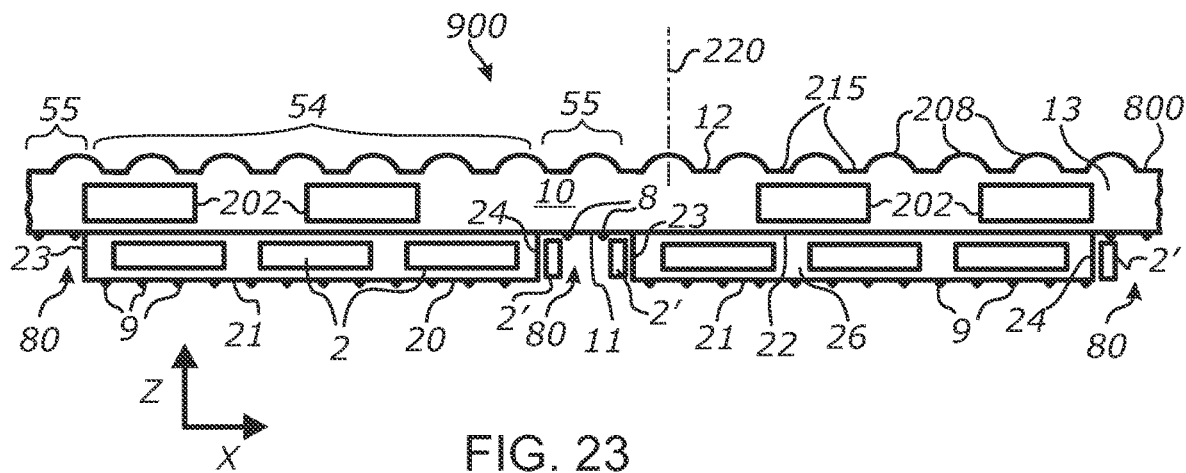

FIG. 23 is a schematic section view of a stepped light guide illumination system, showing an array of rounded ridges or lenses formed in a light emitting surface of a stepped light guide, according to at least one embodiment of the present invention.

Figure 24:
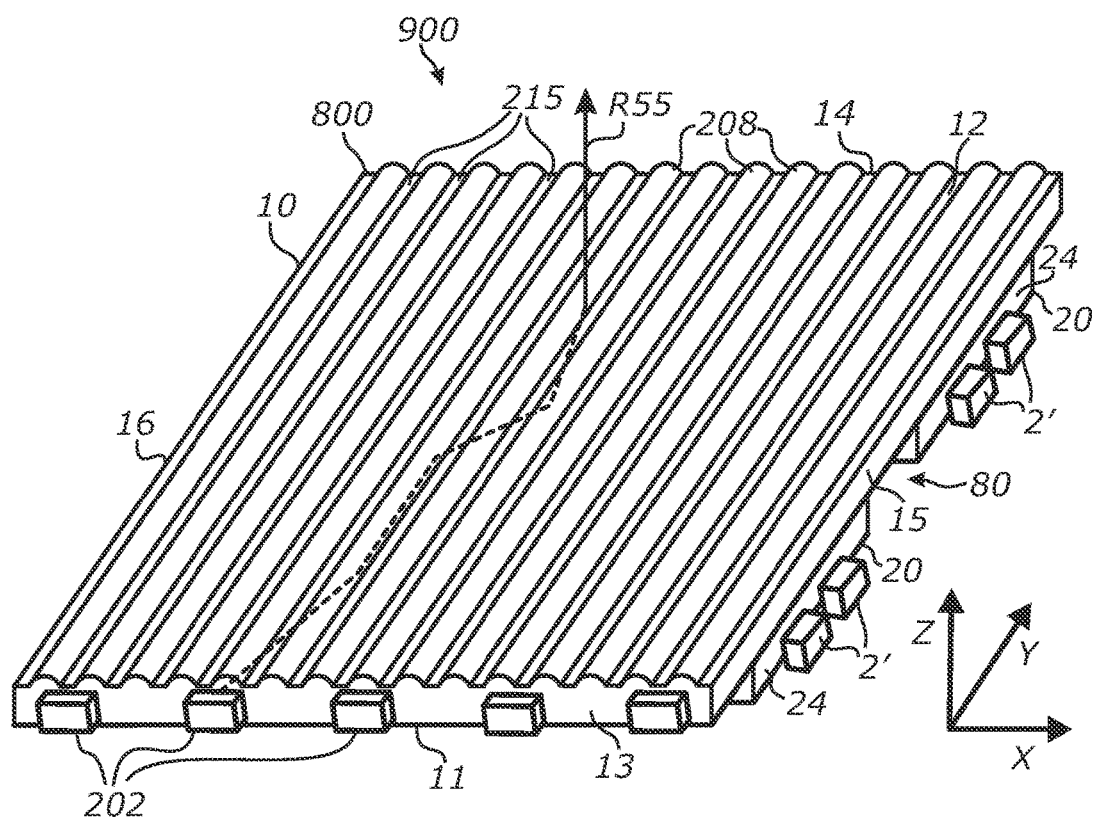

FIG. 24 is a schematic perspective view and raytracing of a stepped light guide illumination system, showing a parallel array or rounded ridges or lenses formed in a light output surface of a planar light guide, according to at least one embodiment of the present invention.

Figure 25:
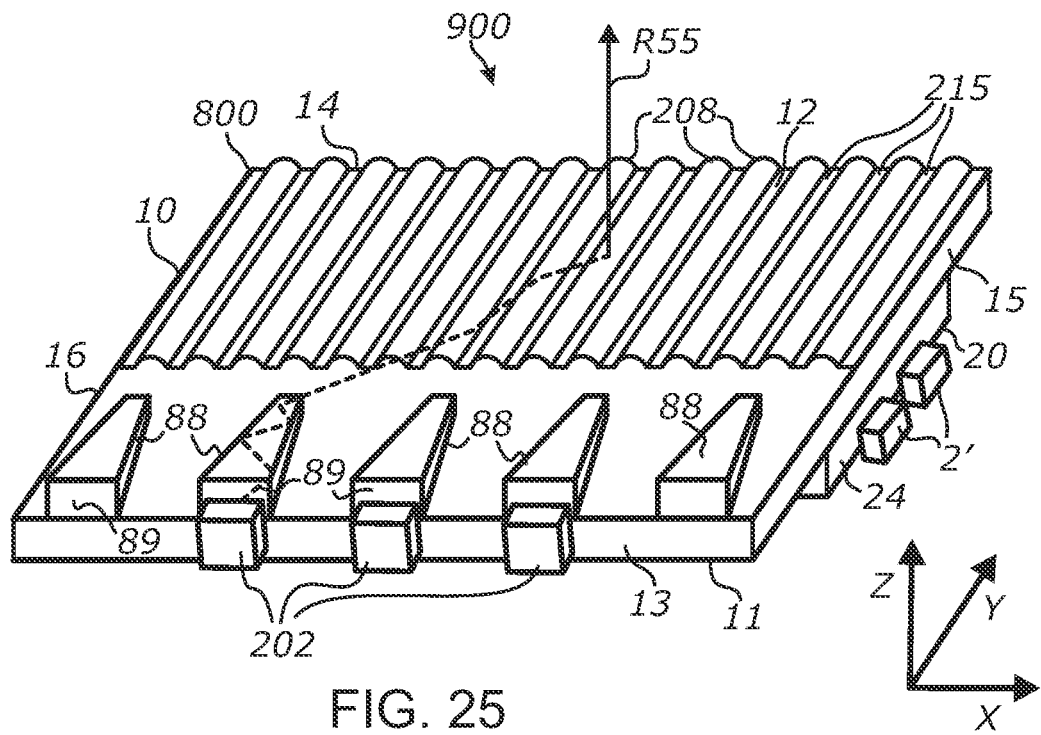

FIG. 25 is a schematic perspective view and raytracing of a stepped light guide illumination system, showing an array of highly elongated optical couplers formed in a surface of a planar light guide and an array or light sources disposed in registration with and coupled to terminal ends of the optical couplers, according to at least one embodiment of the present invention.

Figure 26:
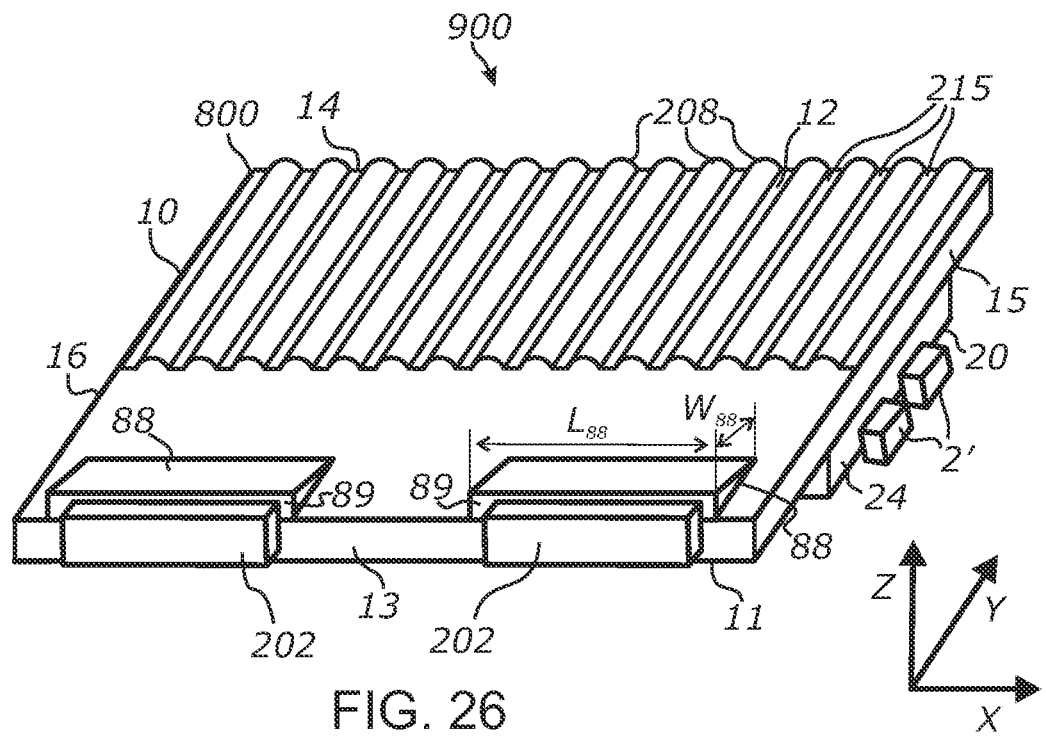

FIG. 26 is a schematic perspective view and raytracing of a stepped light guide illumination system, showing wedge-shaped, highly elongated optical couplers, according to at least one embodiment of the present invention.

Figure 27:
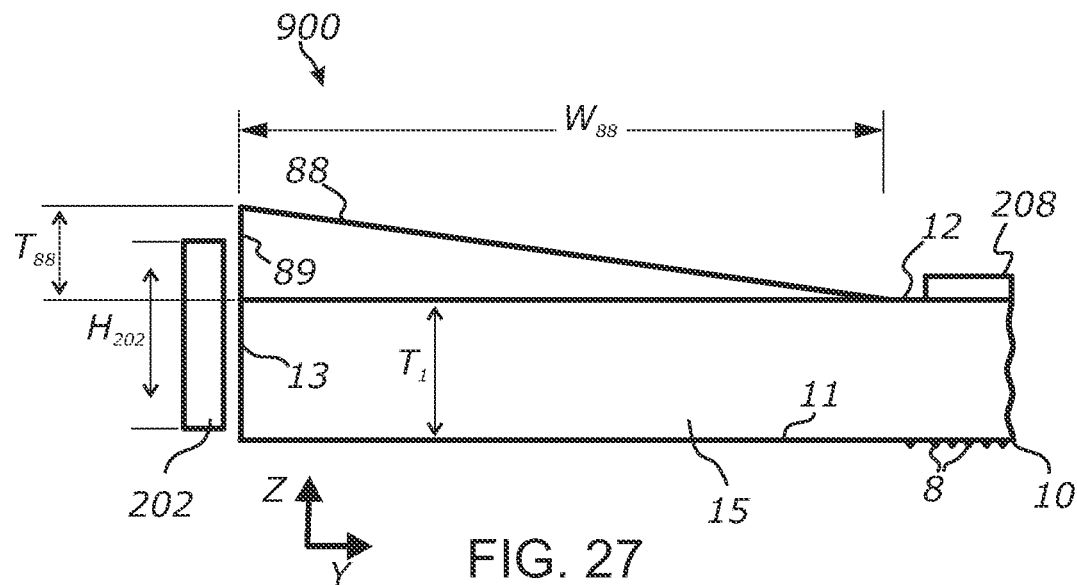

FIG. 27 is a schematic section view of a stepped light guide illumination system portion, showing dimensions of a planar light guiding sheet, an optical coupler, an LED source, a cylindrical lens and a series of light extraction features, according to at least one embodiment of the present invention.

Figure 28:
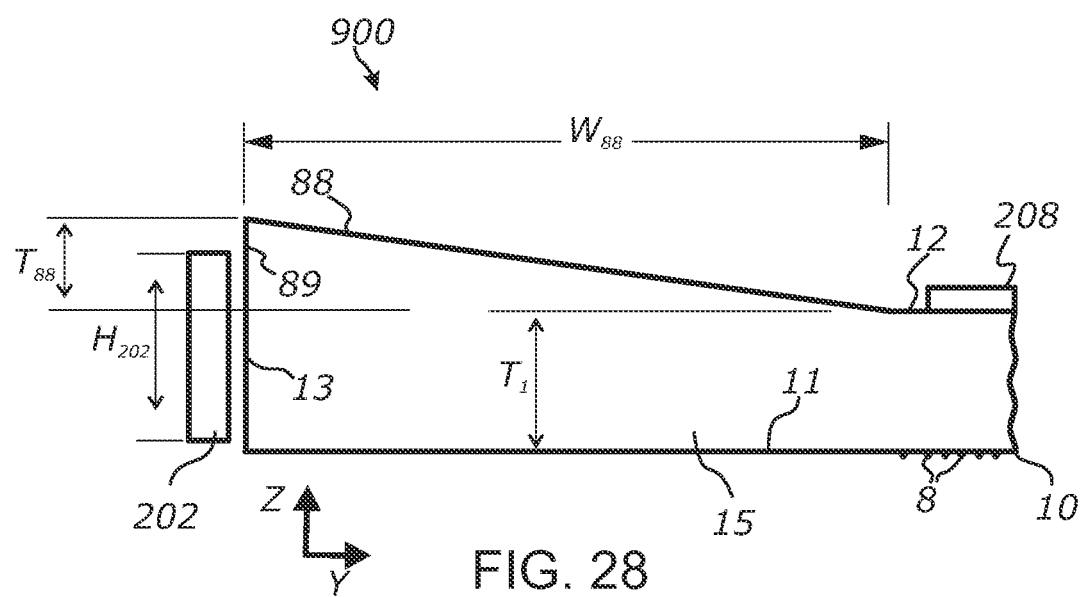

FIG. 28 is a schematic section view of an alternative configuration of a stepped light guide illumination system portion, showing a tapered light input end of a light guiding sheet, according to at least one embodiment of the present invention.

Figure 29:
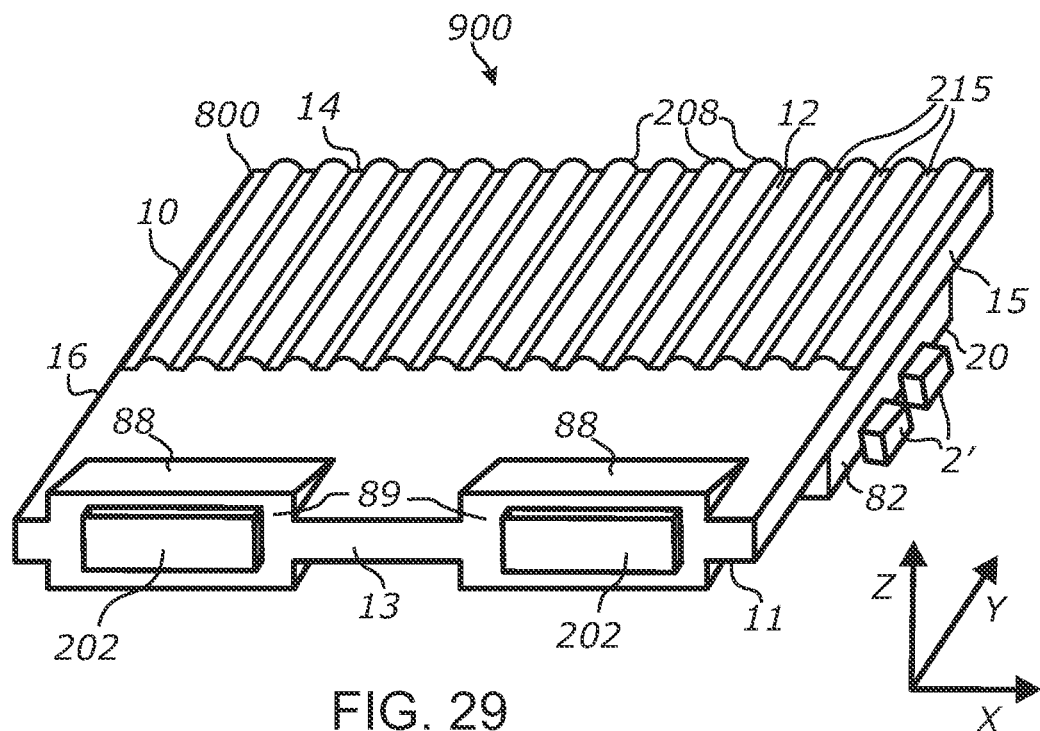

FIG. 29 is a schematic perspective view of a stepped light guide illumination system portion, showing an optical coupler formed in two opposing broad-area surfaces of a light guiding sheet, according to at least one embodiment of the present invention.

Figure 30:
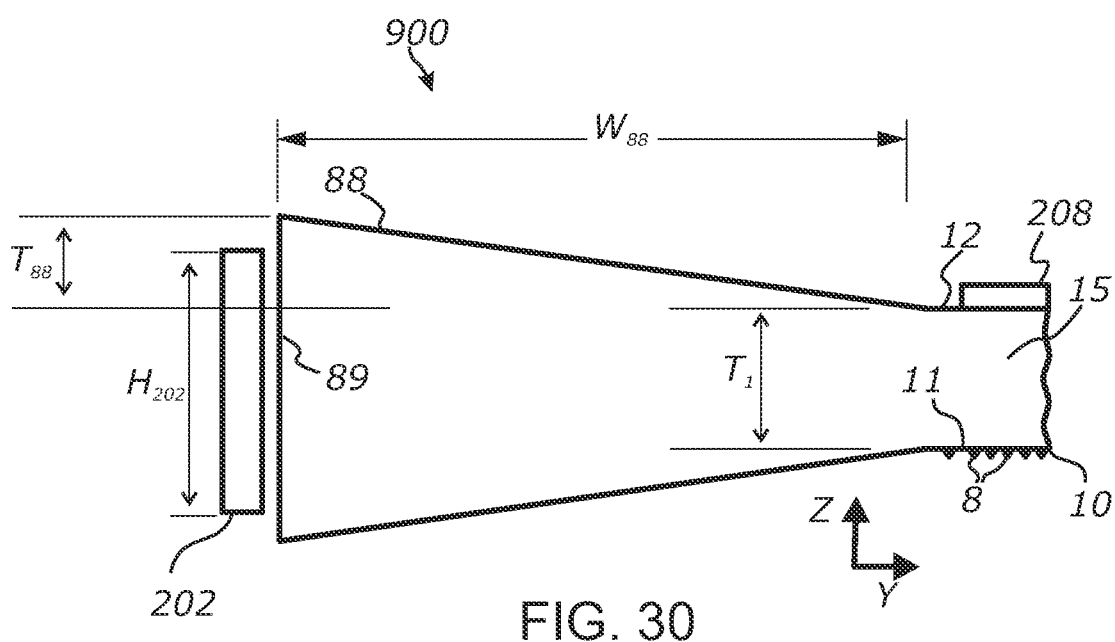

FIG. 30 is a schematic section view of a stepped light guide illumination system portion, showing an optical coupler formed by a symmetrical tapered end of a light guiding sheet, according to at least one embodiment of the present invention.

Figure 31:
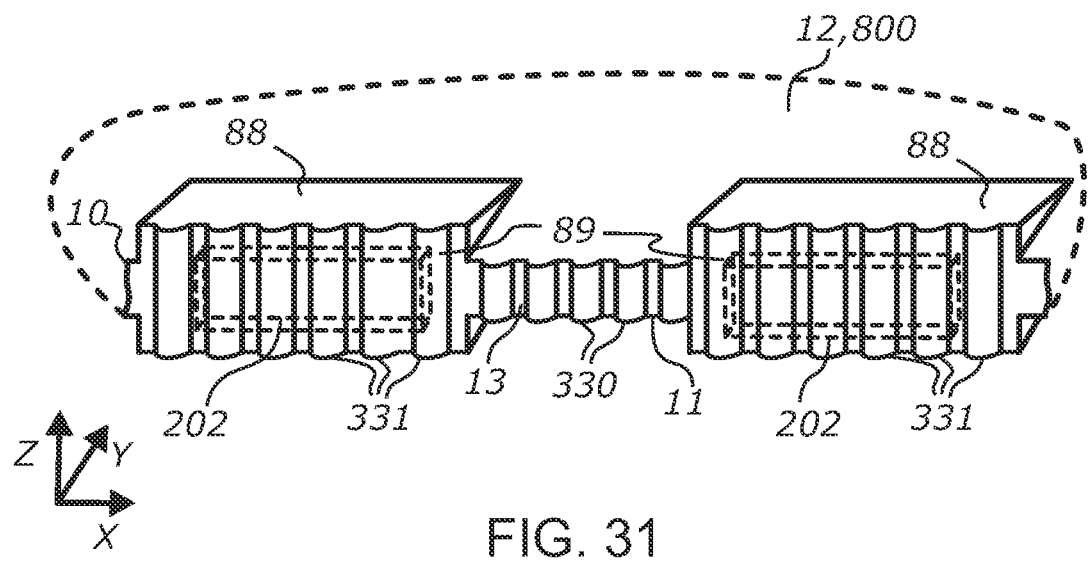

FIG. 31 is a schematic perspective view of a light input edge portion of a light guide, showing an array of first surface corrugations formed in a light input edge surface of the light guide and two arrays of second surface corrugations formed in light input faces of optical couplers, according to at least one embodiment of the present invention.

Figure 32:
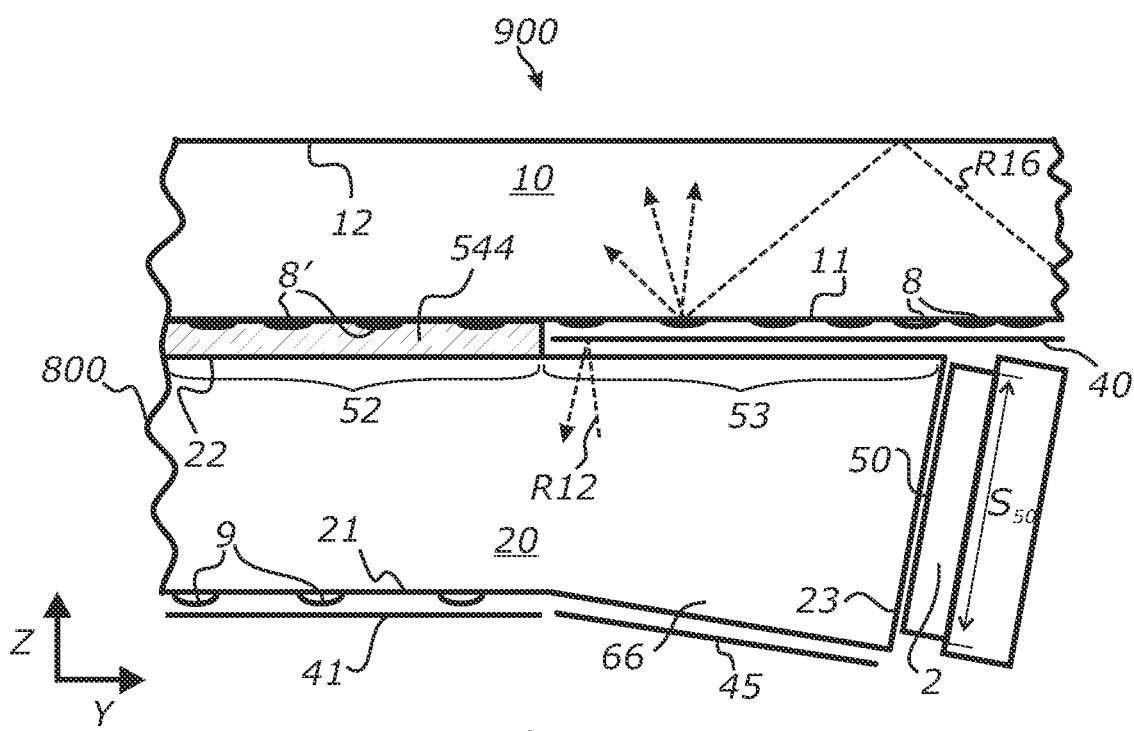

FIG. 32 is a schematic section view of a stepped light guide illumination system portion, showing an array of light extraction features formed in a surface of a first sheet of an optically transmissive material in an area where a second sheet of an optically transmissive material is attached to the first sheet, according to at least one embodiment of the present invention.

DETAILED DESCRIPTION OF THE INVENTION

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Furthermore, many applications exist for the present invention in relation to distributing light by means of a planar optical light guide which hereinafter may also be referenced to as a waveguide. The planar optical light guide (waveguide) refers to a broad class of objects employing an optically transmissive material confined between two opposing broad-area surfaces that are substantially parallel to each other. The term "substantially parallel" generally includes cases when the opposing surfaces are parallel within a reasonable accuracy. It also includes cases when the body of the material defined by the broad-area surfaces has a slightly tapered shape (the taper not exceeding 1 angular degree) or has a slightly varying thickness across the surface. It yet further includes cases when a generally planar body of the light guide includes limited areas where its thickness is different compared to the rest of the light guide.

It is also noted that terms such as "top", "bottom", "side", "front" and "back" and similar directional terms are used herein with reference to the orientation of the Figures being described and should not be regarded as limiting this invention in any way. It should be understood that different elements of embodiments of the present invention can be positioned in a number of different orientations without departing from the scope of the present invention. In the context of the description of a planar light guide and its elements, the term "top" is being generally used to refer to a primary light emitting side of the light guide and the term "bottom" is being generally used to refer to the opposite side (which may or may not be non-emitting) for the sake of convenience of description and not in a limiting sense.

According to the present invention, the planar light guide may be exemplified by a transparent plate, sheet, slab, panel, pane, light-transmitting substrate or any suitable sheet-form of an optically transmissive material, including film thicknesses and rigid and flexible sheet forms. This invention is also applicable to any two-dimensional shape variations of the sheet forms, including but not limited to a square, rectangle, a polygon, a circle, a strip, a freeform, or any combination therein. This invention is further applicable to any three-dimensional shapes that can be obtained by bending the sheet forms accordingly, including but not limited to cylindrical or semi-cylindrical shapes, conical shapes, corrugated shapes, and the like.

According to the present invention, there is provided an illumination system employing an optical light guide exemplified by an optically transmissive, broad-area panel, which may also hereinafter be referred to as a "light guiding panel" or "LGP". The LGP is made from a material which has a refractive index greater than that of the outside medium and is capable of guiding light within the panel by means of a Total Internal Reflection (TIR) from its opposing broad-area surfaces, provided that the internal incidence angles onto either of the surfaces are greater than a critical angle of TIR characterizing the broad-area surfaces.

For the purpose of this discussion, the term "incidence angle" of a light ray in relation to a surface generally refers to an angle that such ray makes with respect to a normal to the surface. It will be appreciated by those skilled in the art of optics that, when referring to light or other forms of electromagnetic waves passing through a boundary formed between two different refractive media, such as air and glass, for example, the ratio of the sines of the angles of incidence and of refraction is a constant that depends on the ratio of refractive indices of the media (the Snell's law of refraction). The following relationship can describe a light bending property of an interface between two refractive media: $n_I \sin \phi_I = n_R \sin \phi_R$, where $n_I$ and $n_R$ are the respective refractive indices of the materials forming the optical interface and $\phi_I$ and $\phi_R$ are the angle of incidence and the angle of refraction, respectively. It will be further appreciated that such optical interface can also be characterized by a critical TIR angle which is the value of $\phi_I$ for which $\phi_R$ equals 90°. Accordingly, for a surface characterized by a stepped drop in refractive index along the propagation path of a ray, the incidence angle may be less than, equal to, or greater than the TIR angle at the given surface.

A TIR angle $\phi_{TIR}$ can be found from the following expression:

$$\phi_{TIR} = \arcsin(n_R/n_I \sin 90°) = \arcsin(n_R/n_I) \quad \text{(Equation 1)}$$

In an exemplary case of the interface between glass with the reflective index $n_I$ of about 1.51 and air with $n_R$ of about 1, $\phi_{TIR}$ is approximately equal to 41.5°.

It will be appreciated that, once light is input into the LGP and its propagation angles permit for TIR to occur at LGP's longitudinal walls, the light becomes trapped in LGP and can propagate considerable distances until it is extracted, absorbed or reaches an edge of the panel, for example.

The present invention will now be described by way of example with reference to the accompanying drawings.

Figure 1:
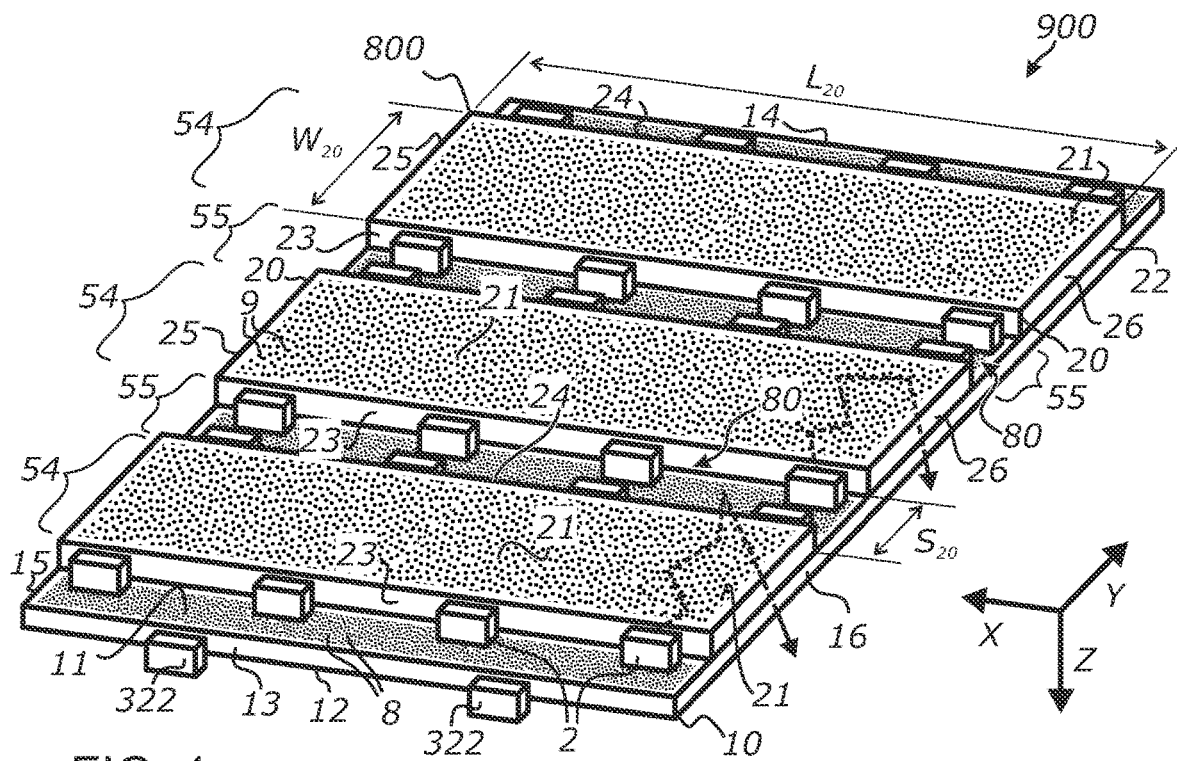
FIG. 1 is a schematic perspective view and raytracing of a stepped light guide illumination system, showing multiple planar light-guiding sheets attached to a surface of a larger planar light guiding sheet and multiple light sources coupled to edges of the sheets, according to at least one embodiment of the present invention.

FIG. 1 depicts a stepped light guide illumination system 900, according to an exemplary embodiment of the invention. Stepped light guide illumination system 900 includes a generally planar light guide 800 that is formed by a first substantially planar base sheet 10 of an optically transmissive material and a plurality of second sheets 20 of an optically transmissive material attached to the base sheet 10. The orientation of planar light guide 800 and its components a three-dimensional space may be conveniently described using orthogonal reference axes X, Y, and Z (see FIG. 1) which also define orthogonal reference planes XY, XZ, and YZ.

Sheet 10 has a rectangular configuration and is defined by opposing broad-area surfaces 11 and 12 and four edge surfaces 13, 14, 15 and 16. Surfaces 11 and 12 extend parallel to each other and extend broadly both longitudinally and laterally along the X and Y axes so as to form a planar sheet form that is parallel to the XY plane. Opposing edge surfaces 13, 14 are parallel to each other, extending parallel to the XZ plane, and opposing edge surfaces 15, 16 are likewise parallel to each other, extending parallel to the YZ plane.

Each sheet 20 is defined by opposing broad-area surfaces 21 and 22 that are parallel to the plane XY and has for edge surfaces, including edge surfaces 23 and 24, which are parallel to the plane XZ, and edge surfaces 25 and 26, which are parallel to the plane YZ. Each sheet 20 has a highly elongated, rectangular configuration with a longitudinal axis extending along the X direction.

Each of sheets 10 and 20 has a non-zero thickness so that light guide 800 has a total thickness defined by a combined thickness of sheets 10 and 20. Referring to FIG. 1, the thicknesses of light guide 800 and sheets 10 and 20 may be conventionally measured along the Z axis (or Z coordinate). According to one embodiment, the thickness of each of sheets 10 and 20 is sufficiently low such that the respective sheets are highly flexible. The term "flexible", as used herein with respect to optically transmissive sheets, is directed to mean that the respective sheet(s) can be flexed with a relative ease without breaking and could normally be returned to the original, e.g., planar, shape or state after such flexing. The term "highly flexible" is directed to mean that the sheet(s) can be easily flexed to a curved shape such that a prevalent radius of curvature of the sheet can be comparable to or less than a dimension of the sheet along which such flexing occurs. For example, a sheet can be considered highly flexible when it can be easily bent such that its opposing ends are parallel to each other (corresponding to a 180-degree bend) or when a ratio between a length and a curvature radius is of the order of 2, 3 or more.

Sheet 10 extends continuously along the entire width of light guide 800 and illumination system 900 (as measured along the X axis). Sheet 10 is preferably formed from a highly transmissive, solid dielectric material and is configured to guide light both longitudinally and laterally in response to optical transmission and TIR from opposing surfaces 11 and 12. Surfaces 11 and 12 are preferably optically smooth and polished to a high gloss. Edges surfaces 13, 14, 15 and 16 may also be polished and configured for reflecting light by means of TIR with high efficiency. One or more edge surfaces 13, 14, 15 and 16 may also be covered with a specularly reflective mirror or a diffuse reflector. For example, such edge surfaces may be coated with a metallic layer (e.g., aluminized or silvered). In another example, strips of a highly reflective material, such as a metallized film or foil may be applied to any of the edge surfaces. The film or foil may alternatively have a matte, light-diffusing surface.

Similarly, each sheet 20 is made from a highly transmissive material and configured to guide light longitudinally and laterally in response to optical transmission and TIR from opposing surfaces 21 and 22. Its edge surfaces 23, 24, 25 and 26 may be polished for promoting TIR. One or more of the edge surfaces may be at least partially coated or covered by a reflector. The reflector may be of a specular type or a diffuse type.

Each sheet 20 is attached to broad-area surface 11 of sheet 10 so that surfaces 11 and 22 form a good physical and optical contact. It may be preferred that surfaces 11 and 22 are mated or bonded together using an optical adhesive or encapsulant to form a single, monolithic structure with good optical coupling and preferably with refractive index matching. Each sheet 20 may be optically coupled to sheet 10 with refractive index matching along the entire extent of surface 22. Alternatively, sheet 20 may be optically coupled to sheet 10 along one or more portions of surface 22. For example, only a central area of surface 22 may be optically coupled with index matching and peripheral areas of surface 22 may be separated from surface 11 by a thin layer of air of a layer of optically absorptive or reflective material.

The term "optically coupled" is directed to mean any relationship between two optical components which enables light to pass from one optical component to the other without being rejected, reflected back or absorbed. The term "refractive index matching", in relationship to an optical coupling, is directed to mean such optical coupling between two refractive optical components where the refractive components are mated together with a tight optical contact, directly or through one or more intermediate optical layers, and without an air gap.

In the context of the present invention, index matching may serve a congruence of goals. One particular goal of the index matched optical coupling is reducing or eliminating the Fresnel reflections at the respective optical interface in a broad range of incidence angles. Another goal may be eliminating or suppressing TIR in an exemplary case where the refractive index of a first optical element is less than that of the second optical element and where the light is expected to propagate from the first element to the second element. In this case, the proper index matching should ensure that no TIR will occur at the respective optical interface within the designed range of incidence angles and that essentially all of the light (e.g., >95%) will be transmitted to the second optical element. It should be understood that index matching generally precludes forming an air gap between the two refractive optical elements which could impede the light passage.

For the purpose of this invention and from the practical standpoint, two optical elements may also be considered optically coupled with index matching when they are disposed in a tight optical contact, directly or through one or more intermediate optical layers, and when the light-receiving optical element has a greater refractive index than the light-emitting component or, if lower, when the differences between the refractive indices are less than a predefined, sufficiently small amount.

According to one embodiment, each sheet 20 may be glued to surface 11 of sheet 10 using an optically clear adhesive which refractive index is approximately equal to or slightly greater than the refractive index of the material of sheet 20. The adhesive should preferably have a relatively high tack and be capable of forming a permanent bond. It is also preferred that the adhesive layer is sufficiently thin so as not to significantly add to the thickness of the resulting structure. According to one embodiment, sheets 20 may be coupled to sheet 10 using one or more intermediate optically clear solid substrates or film-thickness sheets having refractive indices similar to those of sheets 10 and 20. Layers of an optically clear adhesive may be used to bond each of the respective substrates or layers together.

According to one embodiment, the adhesive layer between sheets 20 and 10 may be formed by a two-sided optical adhesive tape or sheet. In one embodiment, it may be formed by a layer of curable optical material applied in a liquid form with the subsequent curing. Suitable non-limiting examples of such adhesives include UV-curable, moisture-curable, or two-component silicones or acrylic-base UV-curable resins conventionally used for mating optical sheets or layers in LCD displays. It may be preferred that the refractive index of the adhesive layer is very closely matched to the materials of sheets 10 and 20, e.g., within 2-3%.

Suitable materials for making sheets 10 and 20 include but are not limited to water-clear (low-iron) glass, Poly (methyl methacrylate) (PMMA or acrylic), polycarbonate, styrene, cured urethane, polyester, silicone, and the like. According to one embodiment, sheets 10 and 20 are made from the same or very similar material (e.g, the same-grade or different grades of acrylic). According to one embodiment, sheets 10 and 20 are made from different materials which nevertheless have similar refractive indices n, such as, for example, acrylic (n≈1.49) and certain grades of glass having the refractive index of around 1.5. The adhesive which is used to bond such sheets may have a refractive index between 1.47 and 1.53.

Each sheet 20 has a length $L_{20}$ and a width $W_{20}$ that is considerably less than length $L_{20}$. According to different embodiments, width $W_{20}$ is less than length $L_{20}$ by at least 1.5 times, at least 2 times, at least 3 times, at least 5 times, and at least 10 times. Sheets 20 are distributed over surface 11 with a spacing distance $S_{20}$ between the nearest edges of adjacent sheets 20. Such spacing distance $S_{20}$ is preferably much less than $W_{20}$. According to different embodiments, spacing $S_{20}$ is less than width $W_{20}$ by at least 2.5 times, at least 3 times, at least 5 times, and at least 10 times.

It is noted that the illustrated position and orientation of sheets 20 with respect to the edges of sheet 10 should not be constructed as limiting this invention in any way. Sheets 20 may also be positioned at any other location of surface 11 and may have identical or different spacing from each other and/or from edges of sheet 10. One or more sheets 20 may be located at and aligned flush with any edge of sheet 10. According to the embodiment illustrated in FIG. 1, sheets 20 are arranges into a linear array with the outermost sheets 20 in the array located at a distance from the nearest edge. According to one embodiment, the outermost sheets 20 may be disposed flush with the nearest edge. Sheets 20 may also be disposed in any other suitable orientation with respect to sheet 10, e.g., diagonally.

According to an aspect of the embodiment depicted in FIG. 1, stepped light guide 800 includes a plurality of sections 54 that are formed by sheets 20 and respective sections of sheet 10 disposed below sheets 20 (or above sheets 20, depending on the orientation). Such stepped light guide 800 further includes a plurality of sections 55 of sheet 10 that are free from sheets 20. Accordingly, each section 54 of stepped light guide 800 has a greater total thickness than each section 55 since such total thickness is defined by a sum of thickness of sheets 10 and 20. The transitions from sections 54 to sections 55 are characterized by a stepped drop in the thickness of stepped light guide 800, thus forming "steps" in the respective broad-area surface of the light guide. Since sections 54 and 55 are alternating with each other in a repeating pattern, stepped drops in a thickness of stepped light guide 800 are alternating with stepped increases in the light guide thickness such that stepped light guide 800 still retains a generally planar configuration.

According to an aspect of the present invention, stepped light guide 800 is formed by base sheet 10 and a plurality of light coupling elements exemplified by sheets 20 attached to a broad-area face (surface 11) of the base sheet. In operation, light that is input into sheets 20 is then coupled into base sheet 10 through its broad-area face (surface 11) rather than through one or more of its edges. Accordingly, certain embodiments of stepped light guide 800 represent a novel variation of a face-lit waveguide illumination system. Further explanation of the principles of light input through a face of a light guide (waveguide) as well as several functional examples of face-lit waveguide illumination systems can be found in the '361 and '666 Publications the disclosure of which is incorporated by reference herein in its entirety.

Stepped light guide 800 may have a fairly large number of sheets 20 attached to a single, continuous base sheet 10 and may thus have a large number of alternating sections 54 and 55. According to different embodiments, stepped light guide may extend up to several meters both longitudinally and laterally, with its size being limited mostly by a maximum practical size of continuous sheet 10. According to different embodiments, continuous stepped light guide 800 may include 2 sheets 20, 3 sheets 20, 4 sheets 20, 5 to 10 sheets 20, and more than 10 sheets 20.

According to one embodiment, multiple stepped light guides 800 may be positioned adjacent to each other in the XY plane to form even larger, sectioned illumination panels. Such multiples light guides 800 may be separated by small air gaps or joined together at their respective edge surfaces (such any one, two, three or all of edge surfaces 13, 14, 15 and 16).

According to an aspect, the plurality of light guiding sheets 20 distributed over surface 11 forms a plurality of parallel channels 80 each having a rectangular cross-section and extending from edge surface 15 to opposing edge surface 16 of sheet 10. A width of such channels 80 is defined by and is thus equal to spacing $S_{20}$. Parallel channels 80 may form a regular array distributed over the entire broad area of the body of light guide 800.

Referring yet further to FIG. 1, stepped light guide illumination system 900 further includes a plurality of light sources exemplified by LEDs 2. LEDs 2 are distributed over surface 11 in a two-dimensional array and arranged in rows and columns. Each row in the array includes a series of LEDs 2 arranged into an individual LED strip and optically coupled to one or more edges of sheet 20. More specifically, each LED 2 is positioned in a close proximity to respective edge surface 23 or 24 of individual sheet 20. Each LED 2 is also oriented with its light emitting aperture towards the respective light input surface so that substantially all of the light emitted by the LED is coupled to the respective sheet 20. It is generally preferred that at least 80% of light emitted by LEDs 2 is coupled to sheets 20 through the respective edge surfaces 23 and/or 24.

Each of the edge surfaces 23 and 24 is associated with a strip of LEDs 2 such that each sheet 20 has at least two strips of LEDs illuminating the sheet from opposing edges. If any of edge surfaces 23 and 24 is provided with a mirrored surface or is covered with a strip of reflective material, openings or window areas for LEDs 2 should be provided within such mirrored/reflective surfaces for an unimpeded light passage from LEDs 2 to sheet 20.

LEDs 2 or at least their light emitting apertures are positioned within channels 80. Accordingly, a width of each channel 80 (same as spacing $S_{20}$) should be sufficient to accommodate at least one or two rows of LEDs 2. Accordingly, spacing $S_{20}$ should be greater than the respective dimension(s) of LEDs 2 (as measured along the Y axis).

Surface 11 of sheet 10 further includes a plurality of light extraction features 8. Light extraction features 8 are formed in the areas that are free from sheets 20 (including sections 55 and portions of surface 11 that are located within channels 80). The areas of the physical contact of sheets 20 with surface 11 (sections 54) are preferably free from light extraction features 8. In other words, light extraction features 8 are preferably formed only in the spaces between sheets 20 or areas surrounding sheets 20.

Light extraction features 8 may occupy substantially the entire exposed area of surface 11 and may also extend all the way to opposing edge surfaces 13 and 14. According to an aspect of the embodiment of FIG. 1, surface 11 has light extracting areas (patterned with light extraction features 8) that are alternating with spacing areas (which are generally free from light extraction features 8) in a repeating pattern. The spacing areas are represented by wide strips (extending along the X axis) which are generally free from light extraction features 8 and which have width $W_{20}$. The light extraction areas are represented by narrower strips (extending along the same X axis) that include light extraction features 8 and that have width $S_{20}$.

Light extracting features 8 may include any suitable optical elements or surface features configured for intercepting and extracting light from sheet 10. Light extracting features 8 may be configured to extract light by means of scattering, reflection, refraction, deflection, and/or diffraction. Light extracting features 8 may be further configured to extract light while changing one or more properties of light. Exemplary properties of light that may be changed by light extracting features 8 include but are not limited to a wavelength, polarization, spectral distribution, angular and/or spatial distribution, and dispersion.

According to one embodiment, light extracting features 8 include relatively small dots of a highly reflective, light scattering material deposited to surface 11 according to an ordered or random two-dimensional pattern. Suitable materials for such light extracting features 8 may include white inks or paints having a reflectance of at least 80% in the visible spectrum, preferably having at least 85% reflectance, even more preferably at least 90% reflectance, and still even more preferably at least 95% reflectance. The light scattering dots may be formed by white inks that are UV-curable, aqueous (water-based) or solvent-based. In a non-limiting example, the light scattering dots can be printed on surface 11 using a flatbed material deposition printer, an ink-jet printer or a screen printer. The white ink may include nanoparticles of titanium dioxide or other type of white, high-reflectance powder suspended in a liquid resin or suspension which viscosity is suitable for the selected type of surface deposition technique.

According to one embodiment, the dots of light scattering material may be microdots that are invisible or barely visible by a naked eye from a normal viewing distance of 40-60 centimeters. By way of example, the microdots may have sizes on a scale of several micrometers to around 100 micrometers. According to one embodiment, the microdots may have sizes from 50 micrometers to 150 micrometers. The microdots may also have irregular shapes or a combination of regular (e.g., round or oval) and irregular shapes.

The thickness of microdots may vary across the surface of the respective sheet. According to one embodiment, the thickness of the material in such microdots may increase with the distance from a light input edge (e.g. edge surface 13). According to an alternative embodiment, such thickness may decrease with the distance from the light input edge. The variability of the thickness of the light scattering material from one microdot to another may be combined with the increase or decrease of the density of microdots across surface 11, for example, to obtain a desired light emission pattern or to homogenize the luminance of surface 11 and/or surface 12 across the entire light-emitting area of stepped light guide 800.

According to one embodiment, surface-deposited light extraction features 8 may include materials that have specific color-filtering or color converting properties and can change the color of light upon light striking such light extraction features. Light extracting features 8 may include a mix of such color-filtering or color converting materials, each material being different from the other(s), such that the optical properties of the emitted light can be altered in more than one way. According to one embodiment, light extracting features 8 may have luminescent properties. For example, the resin or suspension used to print light extraction features on surface 11 may include a luminescent material or phosphor that converts shorter wavelength of light in the UV or visible spectrum into longer wavelengths in the visible range. Such material may be configured to absorb light in a first wavelength and re-emit light in a second wavelength which is different than the first wavelength. According to one embodiment, it is preferred that the second wavelength is greater than the first wavelength. By way of example, such material may be configured to absorb at least a portion of blue light emitted by some types of LEDs and re-emit the energy of such blue light in the form of perceptibly white light. By way of example and not limitation, the luminescent material may be configured to convert 350 nm-400 nm UV light from a "black light" into visible wavelengths.

Light extracting features 8 may be distributed over the designated area(s) of surface 11 according to an ordered or random pattern. According to one embodiment, the ordered pattern may be formed by a two dimensional regular array of rows and columns. In one implementation, every other row or every other column may be shifted relatively to the adjacent rows or columns so as to form a staggered array or rows or columns. According to one embodiment, the positions of individual light extracting features 8 may be randomized within an otherwise ordered pattern. According to one embodiment, light extraction features are distributed according to a high-density pattern and have a cumulative area that is greater than 50% of the exposed area of surface 11. According to one embodiment, substantially the entire exposed area of surface 11 may be coated by a continuous layer of a light diffusing material, such as white ink or bulk scattering particles suspended in a polymeric material, for example.

According to one embodiment, light extraction features 8 are formed by a light scattering or light diffusing film that is attached to surface 11 in the respective areas (e.g., in sections 55 and within channels 80). Such film should preferably have a hemispherical reflectance of at least 85%, more preferably at least 90%, and still more preferably at least 95%.

LED chips employed in LEDs 2 may be configured to emit a blue light. Light extracting features 8 may be configured to change the light emission spectrum upon interaction with blue light propagating in stepped light guide 800. For example, a YAG phosphor may be employed in light extracting features 8 to convert such blue light to a white light. The phosphor material may be mixed with silicone or other material. Light extraction features 8 may be deposited directly to surface 11 in a liquid form, for example, by printing, spraying, dispensing, coating or other suitable methods. Two or more different phosphor materials may be combined to independently control the emission spectrum. The concentration of each phosphor material may be varied from one light extraction feature 8 to another, for example, to obtain various color patterns or effects for different areas of stepped light guide 800. In a non-limiting example, different areas of stepped illumination system 900 may be configured to emit light in different colors in response to different concentrations of one or more phosphor materials in those areas.

According to one embodiment, light extraction features 8 are formed by light-deflecting or light-diffusing surface microstructures formed in surface 11. The microstructures may include ordered or random surface relief features formed, for example, by means of etching, embossing, laser ablation, sanding, micromachining, micro-replication and any other method suitable for producing the desired surface texture or relief.

According to one embodiment, each light extraction feature 8 may be configured to emit light according to a symmetric or quasi-symmetric angular pattern with a peak emission towards a normal direction with respect to surface 11 or towards a direction that deviates from the normal direction by less than 10 degrees. According to one embodiment, the angular pattern may be highly asymmetric, e.g., exhibiting a peak emission towards a direction that makes an angle with respect to the surface normal of greater than 20 degrees, greater than 30 degrees, greater than 45 degrees or greater than 60 degrees.

According to some embodiments, light extraction features 8 may be formed by micro-cavities formed in surface 11. Each micro-cavity may have the shape of a lens, a prism, a groove, a blind hole, or can be simply a microscopic discontinuity in surface 11 allowing some light to escape from light guide 800 in the respective location. According to one embodiment, light extraction features 8 may be formed by highly elongated grooves. The highly elongated grooves may longitudinally extend parallel to edge surface 13, perpendicular to edge surface 13 or at an angle with respect to such surface. According to one embodiment, each highly elongated groove may have near vertical walls and a length that is at least 2.5 times, at least 3 times, at least 3.5 times, at least 4 times, and at least 5 times greater than a transversal width of the groove (the length and width of the groove being measured in the XY plane).

According to some embodiments, light extraction features 8 may be formed by micro-bumps formed in surface 11. Each micro-bump may have the shape of a lens, a prism, or an irregular protrusion in the surface, allowing at least some light to escape from light guide 800 in the respective location. According to one embodiment, each light extraction feature 8 may include a microscopic recess or cavity in surface 11 and an adjacent microscopic protrusion in the surface. For example, individual light extraction feature 8 may be formed by a round micro-crater in surface 11 encircled by a round rim protruding away from surface 11.

The size of individual light extraction features may range from submicron sizes up to several millimeters. According to one embodiment, the size of individual light extraction features 8 is between 1 micrometer and 20 micrometers. According to one embodiment, the size of individual light extraction features 8 is between 20 micrometers and 100 micrometers. According to one embodiment, the size of individual light extraction features 8 is sufficiently small and the spacing between individual features is sufficiently large so that stepped light guide 800 has a substantially transparent appearance at least along a normal (perpendicular) viewing direction.

According to one embodiment, light extraction features 8 may be formed in a separate film or thin-sheet material which is then applied to surface 11 with a good optical contact and preferably with index matching. According to one embodiment, light extraction features 8 may be formed in surface 12. According to one embodiment, light extraction features 8 may be formed both surfaces 11 and 12, for example, to enhance the light extraction rate.

Referring yet further to FIG. 1, each light guiding sheet 20 is similarly provided with light extraction features 9 formed in surface 21. According to one embodiment, light extraction features 9 may be of the same or similar type as light extraction features 8. Any and all features described above in reference to light extraction features 8 may be applied, without limitations and in any combination, to light configuring extraction features 9. According to one embodiment, the optical properties of individual light extraction features 8 and/or 9 may be varied over the areas of respective sheets 10 and/or 20. Light extraction features 8 may also be formed in surface 22 of each sheet 20.

According to some embodiments, certain characteristics of light extraction features 9 or their two-dimensional pattern may be different from those of light extraction features 8, including, for example, a relative area, spatial density, color or spacing between individual light extraction features. The differences may include optical, geometrical, mechanical, chemical and any other type of properties. The differences in properties may also be on the level of individual light extraction features 8 and/or 9.

According to different embodiments, light extraction features 9 may be characterized by different size, thickness, reflectance, absorption, luminescence, fluorescence, light scattering or light deflection properties compared to light extraction features 8. If features 8 and 9 are formed by surface microstructures, the size, geometrical configuration and/or slopes of light deflective facets or sides of features 9 may be different from those of features 8. Any of the above-discussed properties of features 8 and/or 9 may also vary across surfaces 11 and/or 21, in any combination. According to one embodiment, light extraction features 9 may be formed by one type of light deflecting elements (e.g., inkjet-printed microdots) while light extraction features 8 may be formed by a different type of light deflecting elements (e.g., surface microstructures formed by microimprinting or hot embossing). According to one embodiment, either one or both sheets 10 and 20 may include bulk scattering particles embedded into sheet's material and configured for deflecting light propagating in the light guiding mode.

The patterns of light extraction features 8 and 9 are configured to progressively extract light propagating in the respective sheets of light guide 800 and result in a substantially uniform light emission from surface 12. In order to achieve this, each of the respective patterns of light extraction features 8 and 9 may have a variable spatial density which is generally increasing with the distance from LEDs 2. Such variable spatial density can be a function of the size and thickness of the respective sheets 10 and 20 and can be determined from optical raytracing experiments. Sections 54 and 55 of stepped light guide 800 may have different densities of light extraction features 9 and 8, respectively. The spatial density, geometrical parameters and/or optical characteristics of light extraction features may also vary individually within each of the sections 54 and 55.

A uniformity U of luminance of surface 12 may be defined by the following relationship: $U=1-(L_{PEAK}-L_{AVG})/L_{AVG}$, where $L_{PEAK}$ is a peak luminance and $L_{AVG}$ is an average luminance characterizing the surface. The peak luminance may be measured using spot measurements at different locations of surface 12 using a spot luminance meter. The sampling area for spot measurements may be defined by a circular area characterized by a radius that is much smaller than the X and Y dimensions of light guide 800. Depending on the circumstances, a preferred size of the sampling area may also be defined by the characteristics of the measurement tool, the overall size of the panel or the intended application (for example, the anticipated viewing distance). According to one embodiment, the size of the sampling area is smaller than $S_{20}$ and is preferably much smaller than $S_{20}$. In other words, the spot measurements should preferably have sufficient granularity to measure surface luminance variations on a scale that is less than the size of a gap between sheets 20.

According to one embodiment, luminance uniformity U of surface 12 is at least 70%, more preferably at least 80%, even more preferably at least 85%, and yet even more preferably at least 90%. According to one embodiment, a difference between an average luminance of stepped light guide 800 in sections 54 and 55 is less than 30%, more preferably is less than 25%, even more preferably is less than 20%, even more preferably is less than 15%, and still even more preferably is less than 10%.

According to an aspect of the embodiment depicted in FIG. 1, stepped light guide 800 is formed by two distinct light guiding layers which represent different pieces of optical sheet form material. One layer is formed by continuous light guiding sheet 10 and the other layer is formed by a series of smaller-size light guiding sheets attached to sheet 10. Accordingly, light guide 800 has a stepped configuration having a variable thickness. The longitudinal edges of sheets 20 (edge surfaces 23 and 24) define transition areas where light guide 800 has stepped (abrupt) changes in its thickness.

It should be understood that light sources illuminating the light input edges (e.g., opposing edge surfaces 13 and 14) are not limited to light emitting diodes (LEDs) and may include any other suitable single or multiple light sources of any known type, including but not limited to: fluorescent lamps, incandescent lamps, cold-cathode or compact fluorescent lamps, halogen, mercury-vapor, sodium-vapor, metal halide, electroluminescent lamps or sources, field emission devices, lasers, etc. Each light source may have a linear configuration and may include a single linear light-emitting element or a relatively small number of linear light-emitting elements. Each light source may also two or more compact light emitting elements incorporated into a linear array or a narrow two-dimensional cluster. When the light source includes multiple light emitting elements, each of the light emitting elements may have a compact shape or an extended two-dimensional or one-dimensional (elongated) shape.

LEDs 2 may be further associated with integrated or external optics such as collimating or light-redistributing lenses, mirrors, lens arrays, mirror arrays, light diffusers, waveguides, and optical fibers. When multiple light emitting elements are employed, each of the light emitting elements may be provided with individual optics. Alternatively, a single linear optic may be provided for the entire array to collimate light or otherwise shape the emitted beam in a plane which is perpendicular to the longitudinal axis of the array.

According to different embodiments, light may be input into stepped light guide 800 through one, two, three or all four edge surfaces 13, 14, 15 and 16, for example, for maximizing the light output from surface 12.

Stepped light guide illumination system 900 may include a cover of housing configured or encase LEDs 2, channels 80 and optionally encase sheets 20. The housing may also encase or frame the exposed portions and/or edges of sheet 10. Such housing may have different functions including but not limited to structural, protective (from dust, moisture, elements, impact, etc.) and/or aesthetic.

According to an aspect of the embodiment depicted in FIG. 1, stepped light guide 800 defines three distinct parallel planes by surfaces 21, 11 and 12. Light extraction features 9 and 8 are formed in two of these distinct planes (in surfaces 21 and 11, respectively) while light is primarily output from light guide 800 through the third surface (surface 12).

The overall dimensions of stepped light guide illumination system 900, the sizes and shapes of sheets 10 and 20, the types of LEDs 2 as well as their number, spacing and nominal power may be selected based on the target application. According to one embodiment, stepped light guide illumination system 900 may be configured as a flat-panel lighting luminaire. According to another embodiment, it may be configured as a backlight unit of an LCD display. According to a yet another embodiment, it may be configured as a backlight for an illuminated sign, artwork or image print. According to a yet another embodiment, it may be configured as a backlight for a photobioreactor. In any of such applications, a suitable housing may be provided (not shown), which may be designed to cover the non-emitting side of stepped light guide 800 and also enclose sheets 20 and channels 80 with LEDs 2.

Stepped light guide illumination system 900 may further optionally include additional light sources optically coupled to edges of light guiding sheet 10. In FIG. 1, such additional light sources are exemplified by a pair of LEDs 322 coupled to edge surface 13. However, it should be understood that any other number of LEDs 322 may be used. Furthermore, such LEDs 322 may be coupled to two, three, or all four edges of sheet 10.

Figure 2:
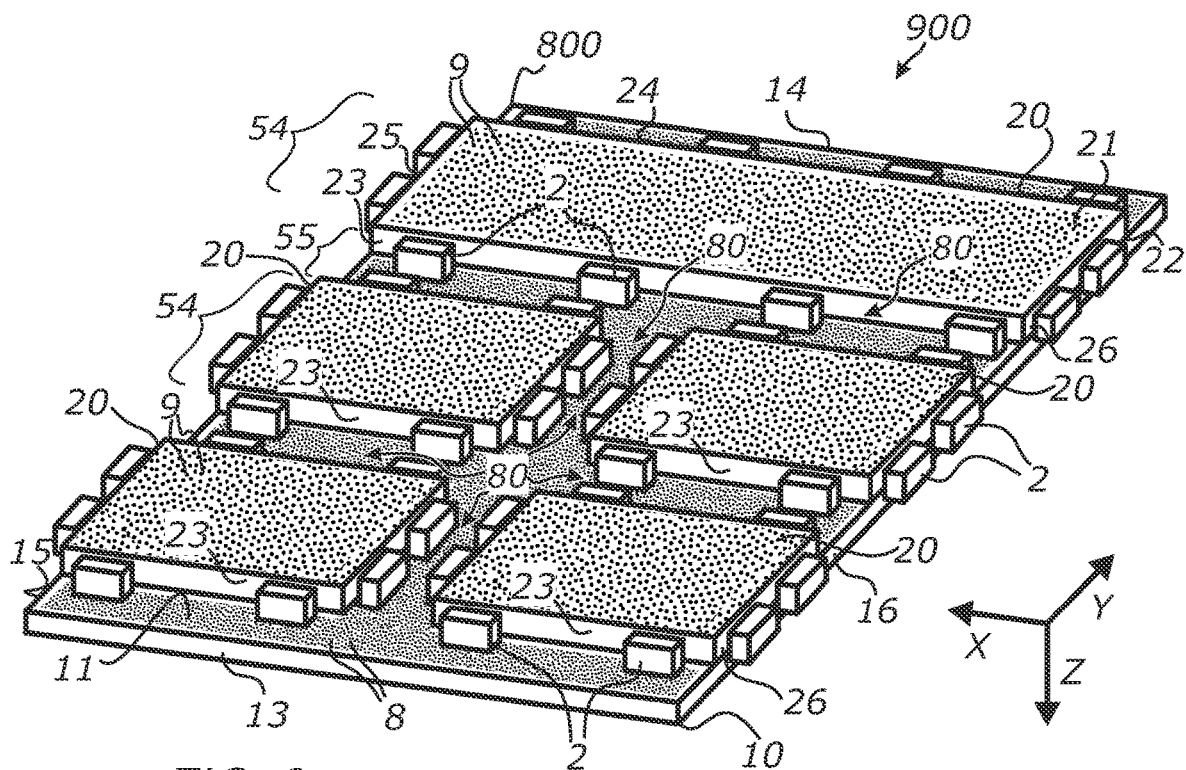
FIG. 2 is a schematic perspective view of an alternative configuration of a stepped light guide illumination system, showing multiple rows and columns of planar light-guiding sheets, according to at least one embodiment of the present invention.

FIG. 2 schematically illustrates an embodiment of stepped light guide illumination system 900 in which sheets 20 have different rectangular shapes and arranged according to a different pattern over surface 11. LEDs 2 of FIG. 2 also have a different arrangement compared to FIG. 1. Referring to FIG. 2, stepped light guide 800 includes one sheet 20 that has the same dimensions as sheets 20 depicted in FIG. 1 and further has four other rectangular sheets 20 having different dimensions. The four other sheets 20 are identical to each other, each having a rectangular configuration, and are arranged into a regular two-dimensional array having two rows and two columns. Each of sheets 20 of FIG. 2 is associated with four linear arrays or LEDs 2 coupled to exposed edges of the sheets. Each of edge surfaces 23, 24, 25 and 26 of each sheet 20 is provided with an array of LEDs 2.

It is noted that stepped light guide 800 may have any suitable number of sheets 20 which may have different shapes and may be arranged in any suitable manner. Similarly to the above-described embodiments of FIG. 1, each sheet 20 of FIG. 2 defines section 54 having a larger thickness while spacing areas between sheets 20 define a plurality of sections 55 of a reduced thickness. The two-dimensional array of sheets 20 defines a first series of parallel channels 80 that are oriented parallel to the X axis and further defines a second series of channels 80 that are aligned parallel to the orthogonal Y axis.

Figure 3:
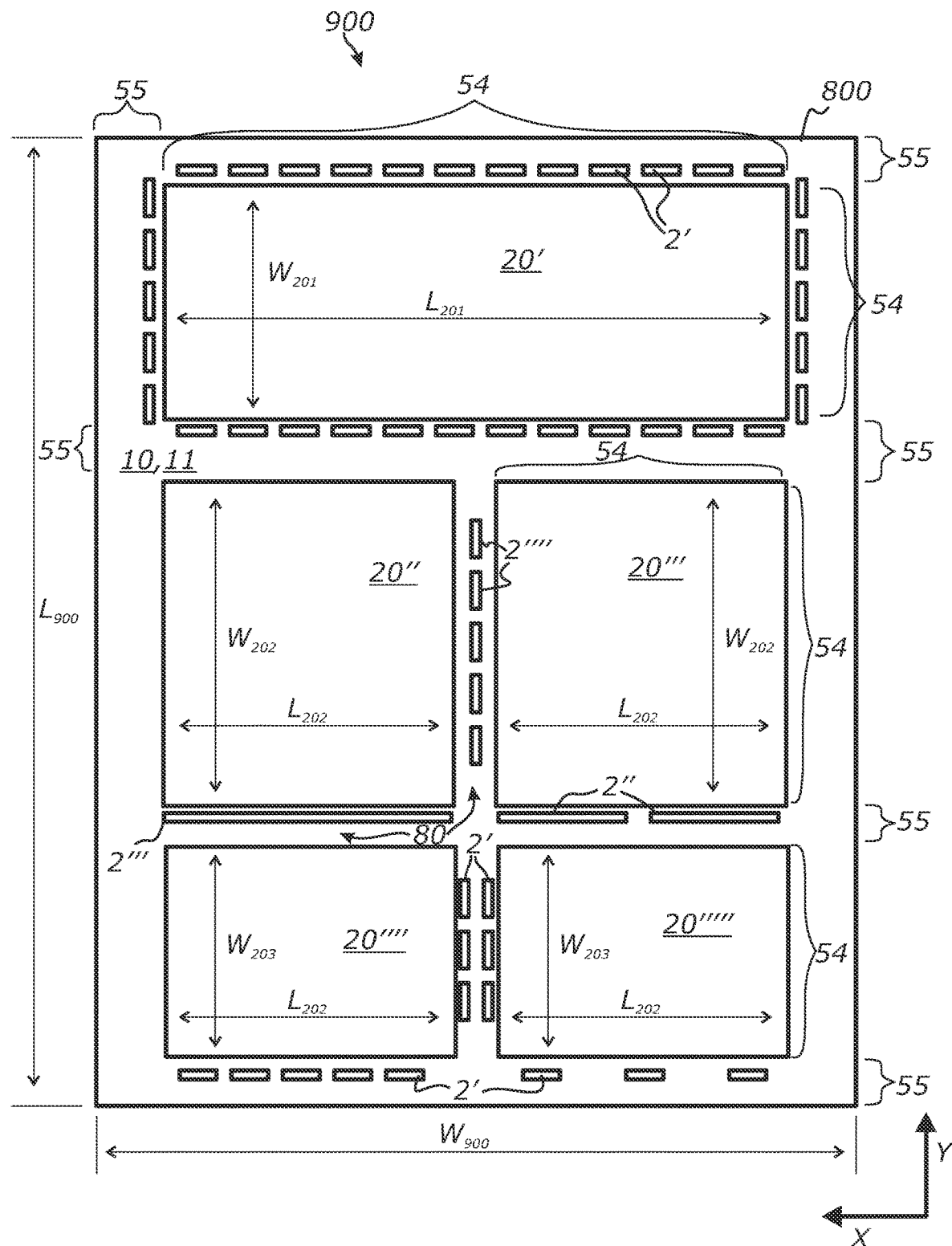
FIG. 3 is a schematic bottom view of a stepped light guide illumination system, showing an alternative arrangement of light guiding sheets, according to at least one embodiment of the present invention.

Stepped light guide 800 may include any other mix of different shapes and sizes of sheets 20. This is further illustrated in FIG. 3 which schematically depicts a yet another arrangement and other shapes of bottom light guiding sheets attached to surface 11 of top base sheet 10. Referring to FIG. 3, a bottom light guiding sheet 20' has a highly elongated rectangular shape having a length $L_{201}$ and a width $W_{201}$, where $L_{201}$ is greater than 2.5 times $W_{201}$. A longitudinal axis of sheet 20' extends parallel to the X axis. A pair of sheets 20" and 20''' have elongated rectangular shapes each having a length $L_{202}$ and a width $W_{202}$. The longitudinal axes of sheets 20" and 20''' extend parallel to the Y axis. $W_{202}$ is greater than $W_{201}$ and $L_{202}$ is significantly less than $L_{201}$. Rectangular sheets 20'''' and 20''''' both have an elongated shape with a length $L_{202}$ and a width $W_{203}$, respectively, and are oriented parallel to the X axis.

FIG. 3 further illustrates different geometrical configurations and patterns of LEDs 2. Sheet 20' is completely surrounded by LEDs 2' which are distributed around the perimeter of the sheet with approximately equal spacing. Sheets 20" and 20''' are illuminated by two-sided LEDs 2'''' which are configured to emit light towards opposing sides and thus illuminate both sheets simultaneously. Sheet 20''' is further illuminated by two highly elongated LEDs 2'' that cover almost the entire area of the respective light input edge. Sheet 20" is further illuminated by a single highly elongated LED 2 which length is about equal to $L_{202}$. Sheets 20'''' and 20''''' are illuminated by LEDs 2' coupled to select edges and having different spacing.

Figure 4:
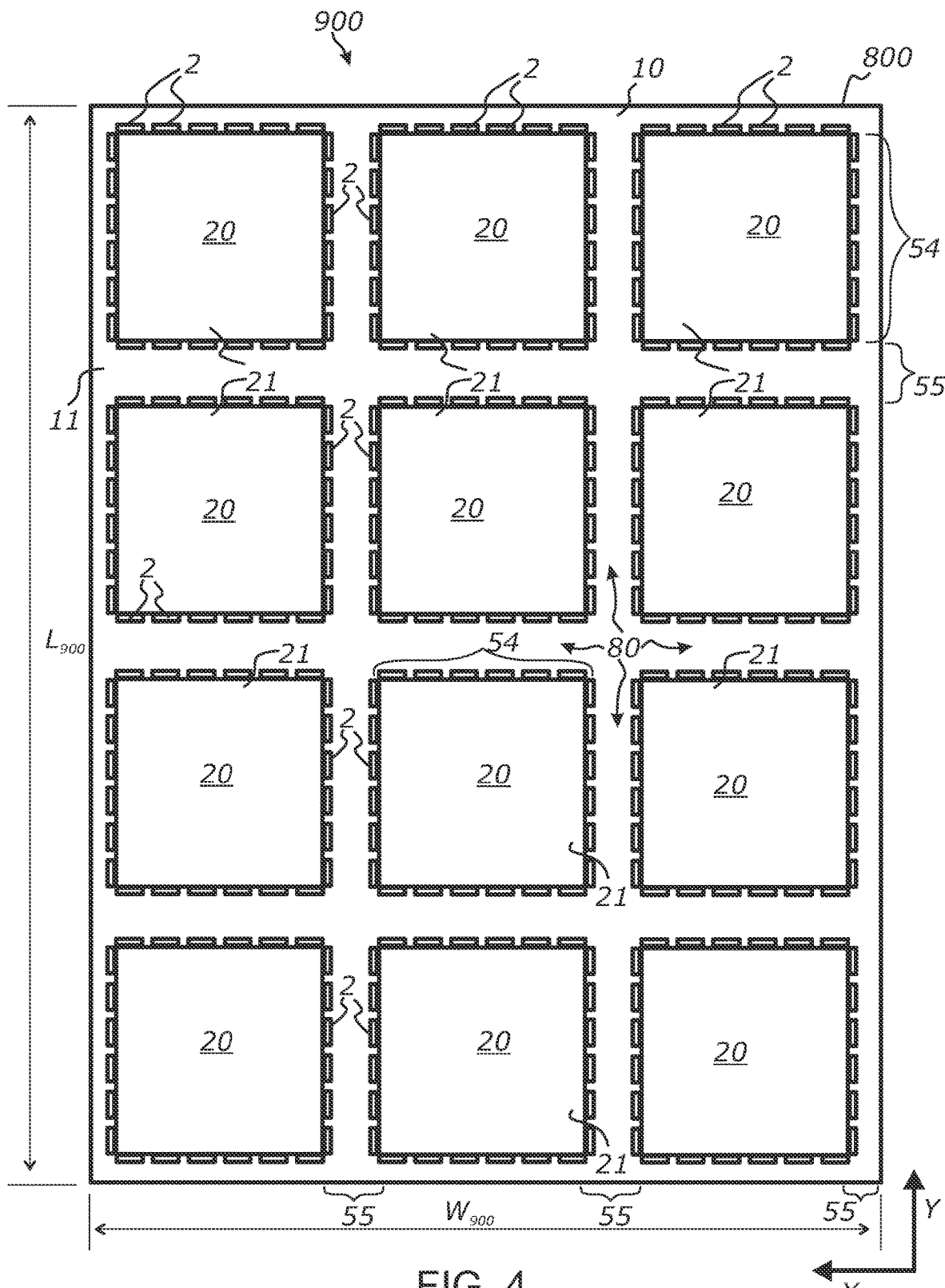
FIG. 4 is a schematic bottom view of a stepped light guide illumination system, showing a two-dimensional array of rectangular light guiding sheets or sections distributed over a base light guiding sheet, according to at least one embodiment of the present invention.

According to one embodiment, at least some or all of sheets 20 may have an identical, substantially square shape. FIG. 4 schematically shows a two-dimensional array of square light guiding sheets 20 distributed over surface 11 of base sheet 10. Densely populated LEDs 2 are covering the entire perimeter of each square sheet 20 and are coupled to the respective edges of the sheet. According to one embodiment, light extracting features 8 and 9 (not shown in FIG. 4 for clarity) may be distributed over surfaces 11 and 21 with a constant density. According to one embodiment, light extracting features 8 and 9 may be distributed over surfaces 11 and 21 with a variable density configured for enhanced uniformity of light output from stepped light guide 800.

According to one embodiment, LEDs 2 may include individually digitally addressable RGB LEDs. Such individually digitally addressable RGB LEDs 2 may be selectively turned on and off or dimmed to illuminate select areas of stepped light guide illumination system 900 in different brightness and/or color.

According to one embodiment, individual groups of LEDs 2 are individually digitally addressable. For example, each group of LEDs surrounding individual sheet 20 may be controlled at once. According to an aspect, individual sheets 20 illuminated by the respective groups of LEDs 2 may be configured and individually controlled as individual "pixels" within a large illuminated LED display. Such LED display may incorporate hundreds or even thousands of sheets 20. For example, each pixel including a single edge-lit sheet 20 may have a size of 1-2 centimeters. Accordingly, an LED display having a size of 4 by 4 meters may include from 40,000 to 160,000 such pixels.

Figure 5:
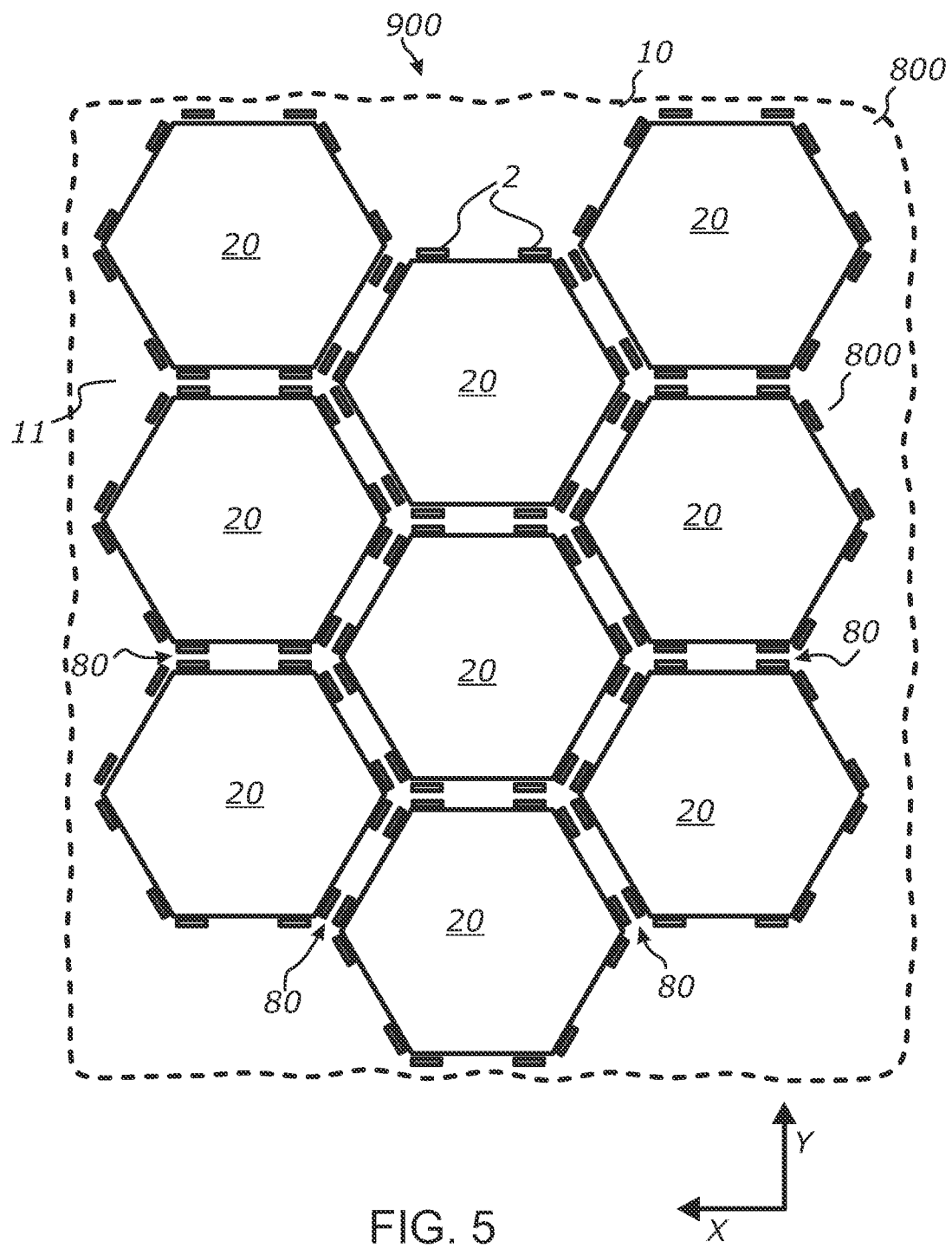
FIG. 5 is a schematic bottom view of portion of a stepped light guide illumination system, showing a two-dimensional array of hexagonal light guiding sheets or sections distributed over a base light guiding sheet, according to at least one embodiment of the present invention.

According to one embodiment, each of sheets 20 may have a hexagonal shape. An exemplary arrangement of such hexagonal sheets 20 over surface 11 is schematically shown in FIG. 5. Each of the side edges of hexagonal sheets 20 is provided with two LEDs 2 illuminating the respective edge surface. It should be understood that such pattern of hexagonal sheets 20 may extend continuously over surface 11 both longitudinally and laterally (along the X and Y directions) to cover sufficiently large areas. Channels 80 formed by hexagonal sheets 20 are arranged into three parallel arrays that are crossed at an angle of 120° with respect to one another. Similarly to the embodiments discussed above, light extraction features 8 and 9 may be provided on the respective surfaces 11 and 21 of sheets 10 and 20. According to one embodiment, the patterns of light extraction features 8 and 9 may be configured for a substantially uniform light output from the entire light emitting area of stepped light guide illumination system 900.

Figure 6:
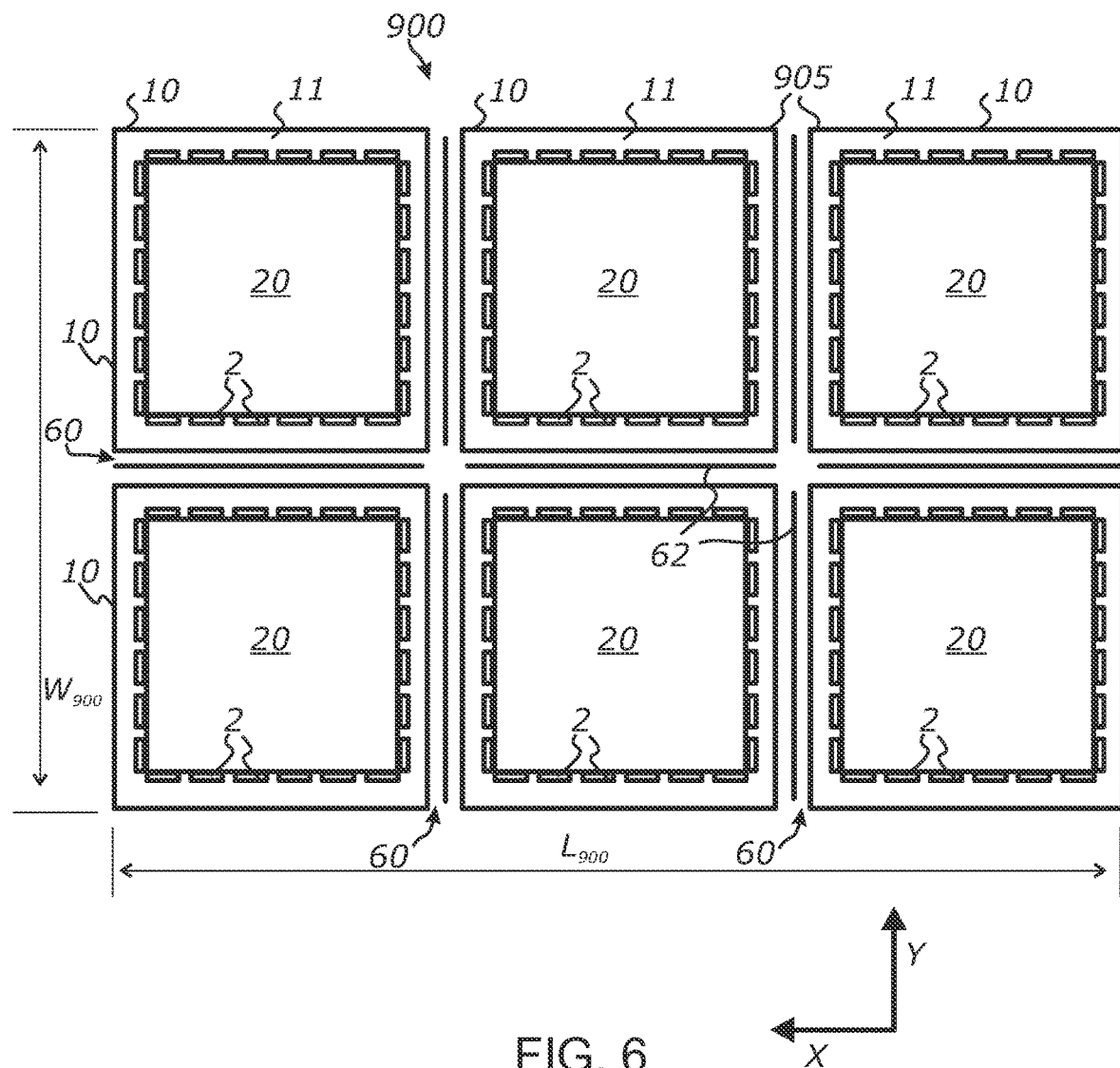
FIG. 6 is a schematic bottom view of portion of a stepped light guide illumination system, showing a two-dimensional array of stepped light guides separated from each other by spacing distances, according to at least one embodiment of the present invention.

FIG. 6 schematically shows an embodiment in which stepped light guide illumination system 900 is arranged into multiple independent sections 905. Sections 905 are separated from each other by long and narrow air gaps 60 which longitudinally extend along the X and Y axes. Each section 905 includes base light guiding sheet 10 and at least one light guiding sheet 20 attached to major surface 11 of sheet 10. LEDs 2 are provided around the perimeter of each sheet 20 and are optically coupled to the respective edges of the sheet. Light control shields 62 may be provided within such air gaps between individual sections 905. Light control shields 62 may be formed by strips of an opaque material positioned in air gaps 60 and oriented perpendicular to the XY plane. Light control shields 62 may be configured to limit light passage from one section 905 to another or even completely optically isolate sections 905 from each other. One or more light control shields 62 may be mirrored for high specular reflectance. One or more light control shields 62 may be made light absorbing, e.g., formed by a black, light absorbing film material.

According to one embodiment, air gaps 60 may be minimized to a near-zero width. According to an alternative embodiment, sections 905 may be positioned in an immediately adjacent position with respect to each other, with no or very minimal air gaps 60. Additionally, sections 905 may be attached to each other at the respective edges and may be further optically coupled to each other with index matching or even fused together to form a single, monolithic, LED-illuminated light guiding structure, for example to allow for a generally unimpeded light passage from one section 905 to another.

Figure 7:
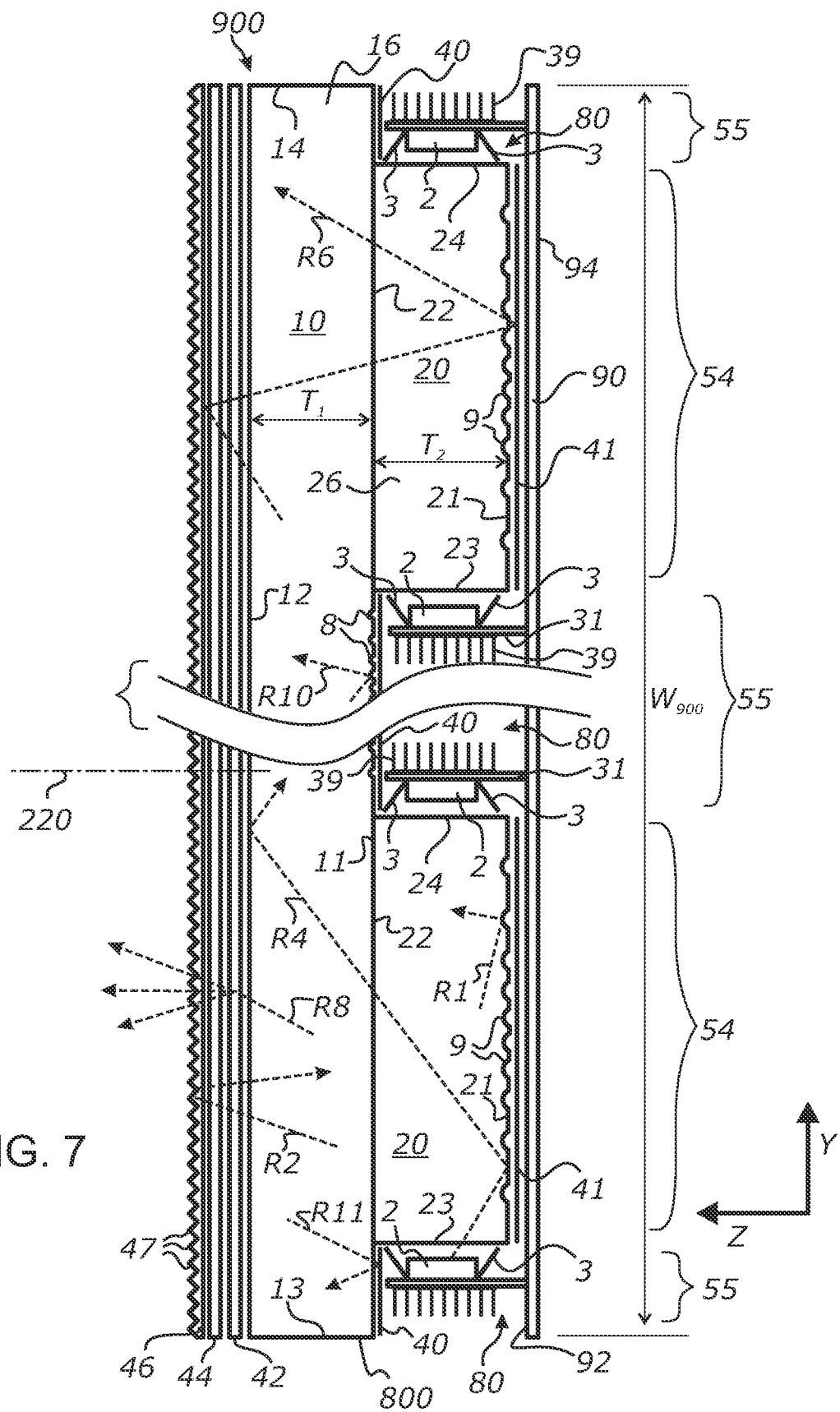
FIG. 7 is a schematic section view and raytracing of portion of a stepped light guide illumination system, showing additional optical layers over a stepped light guide, according to at least one embodiment of the present invention.

FIG. 7 schematically shows an embodiment of stepped light guide illumination system 900 in a cross-section that is parallel to the YZ plane. In this cross-section, the outline of base light guiding sheet 10 is defined by opposing parallel surfaces 11 and 12 and by opposing edge surfaces 13 and 14 than extend perpendicular to surfaces 11 and 12. Each of sheets 20 attached and optically coupled to sheet 10 with index matching is defined by a pair of parallel opposing major surfaces 21 and 22 and a pair of opposing edge surfaces 23 and 24. Base light guiding sheet 10 has a thickness $T_1$ and each of light guiding sheets 20 has a thickness $T_2$.

In the illustrated example, $T_1$ is about equal to $T_2$. However, it is noted that this inventions is not limited to this and may be applied to the cases where $T_1<T_2$, $T_1\ll T_2$, $T_1>T_2$, and $T_1\gg T_2$. According to some embodiments, $T_1 \le T_2 < 1.5T_1$, $1.5T_1 \le T_2 < 2T_1$, $2T_1 \le T_2 < 3T_1$, and $3T_1 \le T_2 < 5T_1$. According to alternative embodiments, $T_2 \le T_1 < 1.5T_2$, $1.5T_2 \le T_1 < 2T_2$, $2T_2 \le T_1 < 3T_2$, and $3T_2 \le T_1 < 5T_2$.

LEDs 2 are positioned in a close proximity to the respective light input edge surfaces 23 and 24. The size of each LED is preferably equal to or less than $T_2$. Each LED 2 is provided with a light collimating element which is exemplified by a pair of reflectors 3 extending from a base of the LED at an angle of about 45% with respect to the base plane. Reflectors 3 are configured to intercept off-axis light rays emitted by LEDs 2 and direct such rays towards the respective edge surfaces 23 or 24 thus enhancing the light coupling efficiency.

Each LED 2 is mounted to an individual heat spreading substrate 31 and is further provided with a finned heat sink 39 for enhanced heat dissipation. Each individual substrate 31 is mounted to a common heat spreading substrate 90. Substrate 90 is defined by opposing parallel surfaces 92 and 94 and may include one or more metallic layers (e.g., copper foil) for enhanced heat spreading and dissipation. Either one or both substrates 90 and 31 may be exemplified by a Printed Circuit Board (PCB). According to one embodiment, the PCB of each substrate 31 may include a metal core or can alternatively be attached to a metal sheet.

Surface 92 may be optionally mirrored for high specular reflectance. Alternatively, surface 92 may be provided with a diffuse reflective coating. According to some embodiments, it is preferred that the reflectance of surface 92 is at least 80%, more preferably at least 85%, even more preferably at least 90%, end still even more preferably at least 95%. Major surfaces of substrates 31 that are facing light input edges (edge surfaces 23 or 24) may optionally be mirrored or provided with a high diffuse reflectance.

Referring further to FIG. 7, a high-reflectance sheet 41 of a highly reflective material is provided between each surface 21 and substrate 90. High-reflectance sheet 41 is positioned in a close proximity to surface 21 and preferably in an immediately adjacent position to surface 21. According to one embodiment, high-reflectance sheet 41 is made from a dielectric film material that has a hemispherical reflectance in the visible spectrum of at least 90% and more preferably 95% or more. The high reflectance of a specular type may be provided by metallization. By way of example and not imitation, high-reflectance sheet 41 may be formed by a multi-layer optical film, such as Enhanced Specular Reflector (ESR) film commercially available from 3M. According to one embodiment, high-reflectance sheet 41 has a diffuse reflectance of at least 90-95% and preferably 96-99%.

Each exposed portion of surface 11 is provided with a high-reflectance sheet 40 that is positioned in a close proximity to surface 11 and more preferably in an immediate adjacent position with respect to surface 11. In a non-limiting example, sheet 40 may be made from the same material as sheet 41. According to one embodiment, sheet 40 is bonded to surface 11 using an optically transmissive adhesive.

Edge surfaces 23 and 24 and the portions of surface 11 flanked by surfaces 23 and 24 define rectangular channels 80 extending parallel to the X axis. Substrate 90 encloses channels 80 and forms a plurality of hollow chambers that extend parallel to the X axis and have a generally rectangular cross-section. The size of such hollow chambers should be sufficient to accommodate the respective strips of LEDs 2 with the associated substrates 31 and heat sinks 39, as well as any associated electrical interconnects, as required. The hollow chambers may be ventilated by a natural convection or forced convection using a fan positioned at an entrance and/or exit of each channel.

Referring yet further to FIG. 7, stepped light guide illumination system 900 further includes several optical management layers on a top side of stepped light guide 800 (on the side of light output surface 12). A first optical management layer is exemplified by a light diffusing sheet 42 which is laid on top of surface 12. It is preferred that there is at least a thin layer of air provided between surface 12 and the light receiving surface of light diffusing sheet 42. To accommodate this requirement, light diffusing sheet 42 may be provided with surface relief features that prevent forming a continuous optical contact with surface 12.

A second optical management layer is exemplified by a first prismatic film 44. Prismatic film 44 includes a plurality of parallel surface microprisms that can deflect light rays emerging from light diffusing sheet 42. According to one embodiment, such surface microprisms are isosceles and are defined by planar surfaces that form a right angle with respect to each other. Prismatic film 44 may be exemplified by a Brightness Enhancement Film (BEF) that is commonly employed in LCD displays. The BEF forming prismatic film 44 may be oriented such that its linear surface microprisms are facing away from surface 12 and longitudinally oriented parallel to the Y axis or at some angle (up to 20° or up to 30°) with respect to the axis Y.

A third optical management layer is exemplified by a second prismatic film 46 having surface microprisms 47 oriented parallel to the X axis or at some angle (up to 20° or up to 30°) with respect to the X axis. By way of example and not limitation, prismatic film 46 may be formed by a second BEF that is oriented perpendicular or near-perpendicular to the first BEF (prismatic film 44). According to an alternative implementation, the orientations of the first and second BEFs may be switched.

According to one embodiment, the first and second BEFs may be bonded to each other at the tips of the bottom BEF. For example, a thin layer of optically clear adhesive may be provided on a bottom surface of prismatic film 46 such that this adhesive bonds portions of the prismatic tips of prismatic film 44 to the bottom surface of prismatic film 46 when the films are pressed against each other.

According to one embodiment, the top BEF may be replaced with or complemented by an optically transmissive light diffusing film. According to one embodiment, such optically transmissive light diffusing film may include a two-dimensional array of micro lenses formed in a surface of the film that is facing away from stepped light guide 800.

Light extraction features 9 are exemplified by dome-shaped cavities formed in surface 21. Light extraction features 8 are exemplified by dome-shaped cavities formed in surface 11. The cavities may also have prismatic shapes or any other shapes suitable for deflecting light. In a non-limiting example, the embodiment of FIG. 7 may be configured as a backlight unit and incorporated into an LCD display.

In operation, a light ray R4 emanated by individual LED 2 enters light guiding sheet 20 through light input edge surface 23 and further propagates in sheet 20 in response to optical transmission and TIR. Ray R4 is then reflected from surface 21 and enters light guiding sheet 10. Since sheet 20 is optically coupled to sheet 10 with refractive index matching, ray R4 enters into sheet 10 without appreciable change in propagation direction or energy loss at the optical interface formed by surfaces 22 and 11. Ray R4 is further reflected from surface 12 by means of TIR. Ray R4 then continues its propagation in light guiding sheet 10 along the Y axis. It may be appreciated that ray R4 may subsequently encounter one of light extraction features 8 formed in surface 11 and may be redirected towards light output surface 12 and extracted from stepped light guide 800, as illustrated by a light ray R10. Alternatively, ray R4 may further re-enter the same or different sheet 20 and encounter one of light extraction features 9 formed in surface 21, in which case ray R4 may be similarly redirected towards light output surface 12 and extracted from stepped light guide 800 towards an intended direction of light emission.

A different light ray R1 propagating in light guiding sheet 20 in a waveguide mode strikes one of light extracting features 9 where it is deflected from its original propagation path and redirected towards light output surface 12 so that it can exit from stepped light guide 800, contributing to the overall light output from stepped light guide illumination system 900.

Light rays R2 and R6 illustrate the operation of stepped light guide 800 in conjunction with the light management layers described above. Ray R2 exiting from light output surface 12 strikes prismatic film 46 and is reflected back towards the light guide by one of microprisms 47. Ray R6 exiting from light output surface 12 strikes prismatic film 44 and is similarly back towards the light guide by the respective microprisms. Ray R6 is subsequently recycled by reflecting from high-reflectance sheet 41 and is again directed towards light output surface 12 so it can have a second chance to exit from stepped light guide illumination system 900.

It may be appreciated that the illustrated structure of stepped light guide illumination system 900 in which one or more BEFs is disposed on the light emitting side of light guide 800 and high reflectance sheets 40 and 41 are disposed in the opposite side of the light guide may be capable of collimating light that is emitted from system 900. Accordingly, such structure may be advantageously selected for applications where such collimation is required, e.g., for maximizing the apparent brightness of a backlit LCD display.

Similarly, high-reflectance sheet 40 may be configured for recycling light that exits from sheet 10 into the hollow chambers formed by channels 80, as schematically illustrated by a light ray R11. Surfaces of high-reflectance sheet 40 that are facing the hollow chambers may be made optically absorptive. The light absorbing side of high-reflectance sheet 40 may be configured, for example, for blocking stray light emanated by LEDs 2. The stray light may include light rays that are not coupled to sheets 20, for example, due to a non-zero air gap between LEDs 2 and edge surfaces 23 and/or 24. The stray light may also include light rays that are reflected from surfaces 23 and/or 24 by means of Fresnel reflection or light rays that exit from sheets 20 through surfaces 23 or 24. The light absorbing side of high-reflectance sheet 40 may also be used for shielding light rays reflected from the interior of the hollow chambers (e.g., reflections from surface 92).

A light ray R8 illustrates the operation of light diffusing sheet 42. Ray R8 exiting from stepped light guide 800 is scattered by light diffusing sheet 42 and may further be redirected by prismatic films 44 and 46, resulting in a diffuse fan of rays emitted from stepped light guide illumination system 900.

FIG. 8 schematically illustrates an embodiment of stepped light guide illumination system 900 in which LEDs 2 are exemplified by side-emitting LEDs mounted directly on a common PCB 96 disposed below stepped light guide 800. The term "side-emitting LED" is directed to mean an LED that is packaged so that the LED's light emitting active layer or light emitting aperture is perpendicular to the surface of a PCB or a heat spreading substrate used for mounting the LED. Conversely, the term "top-emitting LED" is directed to mean an LED that is packaged so that the LED's light emitting active layer or light emitting aperture is parallel to the respective PCB or heat spreading substrate and is light emitting side is generally facing away from the PCB or heat spreading substrate.

Side-emitting LEDs 2 are arranged such that their light emitting apertures 50 are aligned relatively to light input edge surfaces 23 and 24, respectively. Light emitting apertures 50 are formed by the respective light emitting surfaces of LEDs 2. According to one embodiment, LED each LED 2 includes a cavity 51 containing an LED chip or die 99. Cavity 51 may have reflective walls for directing and/or recycling light. Cavity 51 may be conventionally filled with an encapsulation material, such as silicone. The encapsulation material may further include luminescent or fluorescent materials, such as phosphors, for wavelength conversion. A size $S_{50}$ of light emitting aperture 50 is preferably smaller than the thickness of sheet 20. According to one embodiment, $0.3T_2 < S_{50} < T_2$. According to one embodiment, $0.5T_2 < S_{50} < 0.9T_2$. According to one embodiment, $S_{50} = \frac{1}{2} (T_1+T_2)$. According to one embodiment, $0.25\ (T_1+T_2) < S_{50} < 0.5T_2$. According to one embodiment, $0.3(T_1+T_2) < S_{50} < 0.5T_2$. According to one embodiment, $0.2\ (T_1+T_2) < S_{50} < 0.5T_2$.

Side-emitting LEDs 2 may be arranged in series and mounted to a self-adhesive strip. Such strip of LEDs 2 may be attached to a PCB or a heat spreading substrate below stepped light guide 800. Alternatively, the LED strips may be attached directly to a surface of stepped light guide 800. According to one embodiment, high-reflectance sheet 40 is bonded to surface 11 using an optically clear adhesive, and self-adhesive strips of LEDs 2 are bonded to the exposed back surface of sheet 40. When strips of side-emitting LEDs 2 are bonded directly to surface 11, it is preferred than the bottom surface of each LED strip that is used for attaching the strip to surface 11 has a sufficiently high specular or diffuse reflectance. FIG. 8 further illustrates light extraction features 8 and 9 that are formed by dots of a light scattering material deposited to the respective surfaces 11 and 21. According to one embodiment, light extraction features 8 may be formed by a flexible or rigid substrate attached to surface 11. Such substrate may be configured as a strip of having high-reflectance, light-diffusing surface facing surface 11 and an array of side-emitting LEDs 2 attached to an opposite surface of the strip.

FIG. 9 schematically illustrates an embodiment of stepped light guide illumination system 900 in which LED 2 is exemplified by a top-emitting LED having multiple LED chips or die positioned within light-recycling cavity 51. A layer 145 of an optically transmissive adhesive material or encapsulant is provided between light emitting aperture 50 and edge surface 23. Such adhesive material or encapsulant may be configured to provide refractive index matching between the light emitting surface of LED 2 and light input surface 23 of sheet 20, thus eliminating the air gap.

Sheets 10 and 20 of the embodiment illustrated in FIG. 9 are separated from each other by a relatively small distance. This distance is preferably much less than the thicknesses of either one of sheets 10 and 20. A layer 544 of a highly transparent adhesive material is provided between sheets 10 and 20. Layer 544 bonds together surfaces 11 and 22 and provides good optical contact between such surfaces with refractive index matching. Adhesive layer 544 is applied only to a portion of the available contact area of sheets 10 and 20, which defines an optical contact section 52 and a gap section 53 where an air gap exists between sheets 10 and 20.

An opaque light control sheet 43 is positioned within the air gap. Light control sheet 43 may be configured for rejecting stray light entering from sheet 20 into sheet 10 in gap section 53, as illustrated by an exemplary ray R12. Light control sheet 43 may have both sides mirrored for high specular reflectance. Alternatively, the side that is facing towards sheet 10 may be reflective and the side that is facing sheet 20 may be light absorbing or light scattering. The light coupling operation is further illustrated by an example of raytracing a light ray R11.

Ray R11 propagates from LED die 99 to sheet 20 without being trapped by TIR within cavity 51. According to one embodiment, layer 145 may be configured to prevent such light trapping in cavity 51 by means of refractive index matching and eliminating an air gap between LED 2 and surface 23. Ray R11 further propagated from sheet 20 to sheet 10 without being trapped in sheet 20 by TIR due to the refractive index matched optical coupling between sheets 10 and 20.

Optical contact section 52 defines the area of optical contact between sheets 10 and 20. The widths of optical contact section 52 and gap section 53 along the Y axis may be selected based on various factors. For example, a width of gap section 53 (as measured along the Y axis) may be defined by a spacing distance between LEDs 2 along the X axis. For example, the gap width may be selected such that the individual light beams emitted by LEDs 2 can overlap and/or superimpose on one another before reaching section 52 and/or the nearest light extraction features 9. Accordingly, an improved homogeneity of light emission towards surface 12 may be obtained. Light extraction features 9 may be formed only in section 52 and may be generally avoided in section 53 for the same reason. According to different embodiments, the width of section 53 along the Y axis is greater than 1.5 times, 2 times, 2.5 times, and 3 times a spacing distance between LEDs 2 along the X axis.

The area of surface 11 covered with light extraction features 8 may extend into section 53, as illustrated in FIG. 9. At the same time, the area of surface 21 that corresponds to section 53 may be substantially free from light extraction features 9. According to an alternative embodiment, section 53 may include light extraction features 9 and be substantially free from light extraction features 8.

According to one embodiment, referring further to FIG. 9, sheets 10 and 20 may be separated from each other along the entire surfaces 11 and 22 by a continuous air gap such that light can travel within each of the sheets considerable distances in a waveguide mode without appreciable cross-talk between the sheets. Alternatively, sheets 10 and 20 may be disposed in physical contact with each other such that there is still no optical contact or a very limited optical contact between surfaces 11 and 22, e.g., due to the presence of a very thin (on a micrometer scale) air gap between the surfaces.

According to one embodiment, the material of layer 544 may have a refractive index that is considerably lower than that of either one or both of sheets 10 and 20. Such low-refractive-index layer 544 can serve as an optical cladding layer that limits the optical cross-talk between the sheets. For example, both of sheets 10 and 22 may be made from polycarbonate (n≈1.58) and layer 544 may be formed by silicone with n≈1.41-1.43.

FIG. 10 schematically illustrates a top plan view of exemplary outlines of optical contact section 52 and gap section 53 for an exemplary case where LEDs 2 are provided around the entire perimeter of individual sheet 20. FIG. 11 schematically illustrates exemplary outlines of optical contact section 52 and gap section 53 for an exemplary case where LEDs 2 are provided at only two opposing edges of sheet 20.

FIG. 12 schematically illustrates an embodiment of stepped light guide illumination system 900 in which light input edge surface 23 is inclined at an angle with respect to a normal 220 to a prevalent plane of stepped light guide 800. In the illustrated embodiment, the prevalent plane of stepped light guide 800 may be defined as a plane that is parallel the XY plane. The optical axis of LED 2 is accordingly inclined at the same angle with respect to the Y axis. Such configuration of light guiding sheet 20 may be advantageously selected, for example, to enhance the efficiency of light coupling into stepped light guide 800.

As further shown in FIG. 12, LED 2 may be further associated with a light collimating element 64 configured to collimate and direct light emitted by the LED towards edge surface 23. A light ray R14 schematically illustrates light reflection from high-reflectance sheet 40 back to the body of sheet 10.

FIG. 13 schematically illustrates an embodiment of stepped light guide illumination system 900 in which sheet 20 has a tapered, wedge-shaped light input section 66 which is configured for concentrating the light beam emitted by LED 2 and entering sheet 20. According to some embodiments, section 66 has a maximum thickness that is greater than the thickness of the rest of sheet 20, by at least 10%, 20%, 30%, 40% or 50%. Section 66 may be particularly configured to accommodate larger-size LEDs 2 while keeping the thickness of sheet 20 below a certain maximum desirable thickness. For example, size $S_{50}$ of light emitting aperture 50 of LED 2 may be greater than thickness $T_2$ of sheet 20 by at least 10%, 20%, 30%, 40% or 50%.

According to one embodiment, the light input edge of sheet 20 may be shaped in the form of a light-collimating optical element. An example of such a collimator-shaped light input edge is shown, for example in FIG. 8 of the '361 Publication. Referring further to FIG. 13, an opaque light management sheet 45 is provided below tapered section 66 to block stray light that may escape from this section of sheet 20. According to different implementations, light management sheet 45 may be reflective or light absorbing.

FIG. 14 schematically illustrates an exemplary two-dimensional pattern of light extraction features/elements 8 and 9 in a rectangular zone 901. Rectangular zone 901 includes one section 54 which is symmetrically flanked by two sections 55. According to one embodiment, section 54 of FIG. 14 may correspond to a rectangular optical contact area of individual sheet 20 with sheet 10 and sections 55 may correspond to portions of sheet 10 that are not covered by sheet 20. In section 54, light extraction features 9 are distributed in staggered columns extending parallel to the X axis. The density of the columns gradually increases from the respective light input areas towards the center of section 54 along the Y axis. In sections 55, light extraction features 8 are arranged in staggered columns which density increases along the Y axis towards a boundary of rectangular zone 901 (outwardly from the respective sheet 20).

FIG. 15 schematically illustrates a combined distribution pattern of light extraction features 8 and 9 for a larger zone 902 of stepped light guide 800 and shows multiple sections 54 alternating with sections 55. A spatial density of light extraction features 8 and/or 9 may be defined as the number of respective light extraction features per unit area. In each of sections 54 and 55 of zone 902, the respective spatial densities of light extraction features increase towards the center of the section. Accordingly, the overall distribution pattern includes alternating bands having different spatial densities of light extraction features. Furthermore, the spatial density is variable within each band.

A relative surface area of light extraction features 8 and/or 9 at any particular location of surfaces 11 and/or 21 may be defined as a sum of the individual areas of the respective light extraction features within a selected sampling area divided by the total area value of the sampling area. For example, a relative surface area of 0.5 correspond to one-half of the sampling area being occupied by the light extraction features. A relative surface area equal to one means that the light extraction features occupy 100% of the sampling area, with no spaces. Depending on the size and shape of individual light extraction features, the spatial density and relative surface area may be bounded by various relationships.

According to an aspect, FIG. 15 illustrates varying the spatial density of light extraction features 8 and 9 (and, hence, varying the relative area occupied by light extraction features 8 and 9) by varying the spacing between individual light extraction features. However, it should be understood than the relative area may also be varied by varying the size of individual features, even at a constant spatial density. For example, increasing an area of each light extraction feature 8 or 9 by two times within a particular sampling area will increase the relative area of such feature within the sampling area by about two times.

FIG. 16 schematically illustrates an embodiment of stepped light guide illumination system 900 in which optical adhesive layer 544 extends over the entire area of surface 11. The area covered by optical adhesive layer 544 also includes portions surface 11 that are free from sheets 20 and that define sections 55. A light diffusing sheet 48 is attached to an exposed area of optical adhesive layer 544 within channel 80. Light diffusing sheet 48 may be made from an opaque film-thickness material that has a high diffuse reflectance of preferably 85% or more, more preferably 90% and even more preferably 95%. According to an aspect, sheet 48 represents an optically diffusing layer that is optically coupled to sheet 10 with refractive index matching. According to an aspect, the light diffusing layer formed by sheet 48 in section 55 replaces discrete light extraction features 8 illustrated in the preceding figures.

In operation, sheet 48 collects light rays that are incident onto the respective area of surface 11 and reflects such light rays with diffusion, as schematically illustrated by an example of a light ray R30. Light diffusing sheet 48 may be configured to collect and diffusely reflect nearly all light that is incident onto the area of surface 11 disposed directly above sheet 48. Light extraction features 9 are exemplified in FIG. 16 by shallow micro cavities which spacing is progressively decreased with a distance from LEDs 2.

LEDs 2 of FIG. 16 are mounted to PCB 96 and may be exemplified by side-emitting LEDs. Top surfaces of side-emitting LEDs 2 may also be glued to the backside of light diffusing sheet 48. The void between opposing LEDs 2 within channel 80 may be filled with an encapsulant material, such as silicone. The entire channel 80 may be encapsulated, e.g., by filling substantially all available voids within the channel with an encapsulant. According to different embodiments, the encapsulant may be optically transmissive or white-colored, with high diffuse reflectance.

Examples of side emitting LEDs that may be suitable for LEDs 2 include but are not limited to Micro SIDELED product series commercially available from OSRAM (e.g., LW Y87C, CUW Y3SH.B1 and LW Y1SG models of white LEDs or LB Y8SG model of blue LEDs) or models NS2W364G and NS2W266G of white side-emitting LEDs manufactured by Nichia. It is noted, however, that the embodiments of stepped light guide illumination system 900 described herein may also be adapted to other types and form factors of side-emitting LEDs and may further be adapted to any other types and many configurations of LEDs, including square, round or rectangular top-emitting LEDs of various architectures.

Furthermore, non-LED light sources can be used in place of LEDs 2, such as, for example, lasers, fluorescent lamps, incandescent lamps, gas-discharge lamps, and OLEDs. LEDs 2 may incorporate LED arrays or arrays of LED dies within a single package. Suitable examples of such LEDs as well as related methods of LED coupling to light guides (waveguides) which can be utilized in many embodiments of the present invention are disclosed, for example, in the '666 Publication.

FIG. 17 schematically shows an embodiment of stepped light guide illumination system 900 which operation was modeled using optical raytracing simulations, as described in the Example 1 below. The illustrated embodiment includes sheet 10 (a top sheet) and sheet 20 (a bottom sheet) attached to bottom surface 11 of sheet 10. Together, sheets 10 and 20 form exemplary stepped light guide 800.

Stepped light guide illumination system 900 of FIG. 17 includes two LEDs 2 each having a rectangular light emitting aperture which dimensions approximate those of edge surfaces 23 and 24. LEDs 2 are positioned in a close proximity to respective edge surfaces 23 and 24 so that practically all light emitted by the LEDs is injected into sheet 20. Sheet 10 has a length $L_{TOP}$ along the Y axis and thickness $T_1$ along the Z axis. Sheet 20 has a length $L_{BOT}$ along the Y axis and thickness $T_2$ along the Z axis.

High-reflectance sheet 41 is positioned below surface 21 in a close proximity to the surface (with a minimum air gap). A pair of high-reflectance sheets 40 are positioned below the exposed portions 91 and 92 of surface 11, also with a minimum air gap. Exposed portions 91 and 92 of surface 11 are provided with light extraction features 8 which are formed by dots of highly reflective, diffuse material deposited to the surface in predetermined locations. Light extraction features 8 and are distributed over surface portions 91 and 92 with a variable spatial density determined from raytracing. Light extraction features 9 are formed on surface 21 by dots the same material as light extraction features 8. However, light extraction features 9 have a generally different spatial density (compared to features 8) which is also determined from raytracing. Opposing edge surfaces 13 and 14 of top base sheet 10 are mirrored with specular reflectance close to 100%. A width of sheets 10 and 20 along the X axis is arbitrarily selected to be approximately equal to $L_{TOP}$.

It may be appreciated that the illustrated configuration may be representative of stand-alone system 900 including just single sheet 10 and single sheet 20 attached to surface 11. On the other hand, FIG. 17 may also represent a section or a "tile" being a part of larger system 900 which includes a number of such sections or tiles. The tiles may be optically isolated from each other at edge surfaces 13 and 14. Alternatively, multiple tiles may be contiguous and optically connected to each other at edge surfaces 13 and 14. Accordingly, intensity profiles along the Y axis obtained for the illustrated stand-alone configuration of system 900 with simulated mirrored edge surfaces 13 and 14 may also be representative of intensity profiles of configurations of system 900 where edge surfaces 13 and 14 are not mirrored but used to connect multiple tiles of the same design or where edge surfaces 13 and 14 merely represent imaginary boundaries between contiguous sections of the same, continuous stepped light guide 800. A reference line 270 represents an axis of symmetry of the exemplary design depicted in FIG. 17.

Example 1

Stepped light guide illumination system 900 of FIG. 17 was modeled using raytracing with the following parameters: $L_{TOP}$=100 mm; $L_{BOT}$=80 mm; the width of sections 91 and 92 being 10 mm each, $T_1$=$T_2$=5 mm; sheets 40 and 41 being mirrored and having a specular reflectance of 90%, the reflectance of surfaces 13 and 14 being 100%; the material of sheets 10 and 20 being PMMA (acrylic) with n=1.49; the height of light emitting aperture of LEDs 2 being 5 mm (same as the thickness of sheet 20). A registration surface 272 was positioned in a close proximity (about 0.1 mm) from surface 12 to register all rays exiting from the surface. The light extraction features 8 and 9 were modeled as 0.25 mm square surface areas having a 100% diffuse reflectance and producing a lambertian ray pattern upon reflecting an incident light beam. Sheets 10 and 20 were mated together with an ideal optical contact.

FIG. 19 shows a calculated relative luminance profile (shown as a curve 1030) of light output surface 12 along the Y axis (see FIG. 17). The relative uniformity of surface luminance was obtained by iteratively adjusting the relative surface area of light extraction features 8 and 9 at various locations of surfaces 21 and 11, respectively.

FIG. 18 shows a calculated distribution of the relative surface area of light extraction features 8 and 9 that produced the luminance profile of FIG. 19. A curve 1020 represents the distribution of a relative surface area of light extraction features 9 over surface 21 (in section 54). Curves 1021 and 1022 represent the distributions of a relative surface area of light extraction features 8 over surface 11 in sections 91 and 92 (also sections section 55).

As it can be seen from FIG. 18, the combined distribution of relative surface area of light extraction features 8 and 9 exhibits a stepped change in the density of light extraction features at two transition areas. These transition areas correspond to the locations of stepped changes in the thickness of stepped light guide 800 (the locations of edge surfaces 23 and 24).

The respective stepped changes in the density of light extraction features may be characterized by a magnitude $M_{1020}$. Magnitude $M_{1020}$ may depend on several factors, including, for example, the difference between thicknesses $T_1$ and $T_2$, the overall thickness of stepped light guide 800, its length and the relative length of the side sections of sheet 20. In the illustrated case, magnitude $M_{1020}$ is about 0.3 as the relative area of light extraction features undergoes stepped changes from about 0.3 to about 0.6 at the transition location from sheet 20 (section 54) to sheet 10 (sections 55). In other words, the magnitude of the stepped change in the relative area of light extraction features is of the order of 2.

End of Example 1

Accordingly, as shown by the Example 1, stepped light guide illumination system 900 can be designed for a substantially uniform light output from the entire area of surface 12 by appropriately selecting the distribution density of light extraction features 8 and/or 9 and without varying other optical parameters of the system. According to one embodiment, the luminance of surface 12 can be made uniform within 25% from an average luminance of the surface, more preferably within 20%, even more preferably within 15% and still even more preferably within 10%.

According to an aspect of the graph of FIG. 18, magnitude $M_{1020}$ may represent a difference between a minimum relative surface area $RA_{MIN\_9}$ of light extraction features 9 and a minimum relative surface area $RA_{MIN\_8}$ of light extraction features 8. According to different embodiments, a ratio $RA_{MIN\_8}/RA_{MIN\_9}$ may be at least 1.3, at least 1.5, at least 2, and at least 3 or more.

According to an aspect, a ratio between an average or total relative surface area $RA_{AVG\_8}$ of light extraction features 8 and an average or total relative surface area $RA_{AVG\_9}$ may be greater than a unity. According to different embodiments, a ratio $RA_{AVG\_8}/RA_{AVG\_9}$ may be at least 1.1 or more, at least 1.2 or more, at least 1.3 or more, at least 1.4 or more, and at least 1.5 or more.

According to one embodiment, the relative surface area or density of light extraction features 8 may be selected to minimize light transfer through sections 55 and cross-talk between adjacent sections 54. For example, a sufficiently high density for light extraction features 8 may be selected to intercept more than 50%, more than 75%, more than 85%, and more than 90% of light rays entering the respective section 55 from adjacent section 54.

It may be appreciated that a relative high density of light extraction features 8 (e.g., compared to the density of light extraction features 9 near the light input edges of sheets 20) may allow for optically isolating sheets 20 from each other. For example, in embodiments of stepped light guide illumination system 900 employing multiple sheets 20, the density of light extraction features 8 may be selected to allow less than 10% of light to travel from one sheet 20 to adjacent sheet 20 through section 55 separating such sheets. Greater densities of light extraction features 8 may also be advantageously selected for the cases where the widths of sections 55 (as measured along the Y axis, for example) are relatively small, e.g., to additionally enhance the rate of light extraction in such sections 55.

FIG. 20 schematically depicts an embodiment of stepped light guide illumination system 900 in which adjacent sheets 20 are positioned fairly close to each other, providing a relatively narrow spacing for positioning LEDs 2 (narrow section 55). A series of LEDs 2 illuminating both sheets 20 are arranged into a single linear array or strip of LEDs. Some LEDs 2 are facing towards edge surface 24 and some LEDs 2 are facing towards edge surface 23. LEDs 2 that are facing edge surface 24 are alternating with LEDs 2 that are facing edge surface 23 to form an alternating pattern of light sources illuminating both sheets 20 and arranged into a single row.

FIG. 21 schematically depicts an embodiment of stepped light guide illumination system 900 which is similar to that of FIG. 20 except that light input edges of sheets 20 have surface corrugations 330 formed in respective edge surfaces 23 and 24. Such surface corrugations 330 may be configured to disperse light entering sheets 20 in the XY plane (as schematically illustrated by light paths of individual rays) and improve light mixing within sheets 20. As illustrated in FIG. 21, each surface corrugation 330 may have a symmetrical configuration relatively the Y axis in a cross section parallel to the XY plane. According to different embodiments, each surface corrugations 330 may have a symmetrical prismatic shape, a trapezoidal shape, a circular/hemispherical shape, or a partial circular shape. According to one embodiment, surface corrugations 330 are formed by an array of rounded ridges or lenticular lenses longitudinally extending parallel to the Z axis.

Surface corrugations 330 may be formed in any edge surface of sheets 10 and/or 20 that is illuminated by an external light source, e.g., LEDs 2. For example, referring to FIG. 1 and FIG. 2, surface corrugations 330 may be formed in each or in any combination of surfaces 13, 14, 15, 16, 23, 24, 25, and 26.

FIG. 22 schematically depicts an embodiment of stepped light guide illumination system 900 in which sheet 10 and 20 are combined together to form an integral, single-piece, stepped light guiding structure of light guide 800 operating according to the same principles discussed above. Such monolithic structure may be formed from a solid dielectric material as a single piece. For example, it may be formed by means of injection molding or compression molding. In a further example, multiple sheets 20 may be overmolded on a common substrate formed by sheet 10. In a yet further example, sheets 10 and 20 may be formed from different materials and permanently bonded or fused together to form an integral, monolithic light guiding optical structure.

According to one embodiment, channels 85 of FIG. 22 may be formed by machining a blank, single-piece sheet of glass or plastic material. For example, a method of making stepped light guide 800 may include providing a planar sheet of optically clear PMMA and machining a parallel array of channels 85 using a rotary milling bit. The milling but may have diamond-tipped edges and may be shaped to produce a rectangular groove or channel in a single pass or multiple passes my moving it through the material of PMMA sheet along the X axis. Similarly a second, perpendicular, array of channels 85 may be machined using the same bit by moving it in a perpendicular direction (along the Y axis).

Referring to FIG. 22, monolithic stepped light guide 800 is defined by a front light emitting surface 212, a rear surface 214 and a plurality of parallel channels 85 having rectangular cross-sections. Channels 85 may be arranged in a single parallel array or two parallel arrays crossed at an angle with respect to each other, such as, for example, two parallel arrays that are orthogonal to each other. Channels 85 may be configured and distributed over the area of stepped light guide 800 in a similar fashion as channels 80 described in the preceding embodiments.

Each channel 85 defines a pair of side surfaces 82 and 83 and a base surface 213. LEDs 2 are coupled to side surfaces 82 and 83. Light extraction features 8 are formed in base surfaces 213 and light extraction features 9 are formed in portions of rear surface 214 between channels 85. The portions of stepped light guide 800 having a greater thickness define sections 54 and the portions having a lower thickness define sections 55. Channels 85 may be optionally encapsulated, e.g., partially or completely filled with silicone to form a continuous sheet-form illumination structure of a constant or near-constant thickness with LEDs 2 embedded into such structure. A layer of adhesive may be provided on rear surface 214 of stepped light guide 800 to facilitate attaching the light guide it to various surfaces. According to one embodiment, a sheet of highly reflective, specular material, e.g., 3M's ESR film, may be provided on the side of surface 214 of stepped light guide 800 and configured to reflect substantially all light emerging from surface 214. The highly reflective sheet may be bonded to surface 214 using an optically clear adhesive. According to an alternative embodiment, the highly reflective sheet may be of a diffuse type in which case it should be positioned in a close proximity to surface 214 or disposed in physical contact with surface 214 provided that the optical contact between the highly reflective sheet and surface 214 is basically prevented or at least minimized.

FIG. 23 schematically depicts a partial section view an embodiment of stepped light guide illumination system 900 in which top light emitting surface 12 is provided with surface microstructures. Such microstructures are exemplified by an array of parallel rounded ridges defining lenticular or cylindrical linear lenses 208. FIG. 24 schematically depicts a perspective view of an embodiment of stepped light guide illumination system 900 which has a similar basic arrangement as the embodiment depicted in a cross section in FIG. 23.

According to one embodiment, the rounded ridges forming lenses 208 may be formed directly in surface 12 such that sheet 10 has a monolithic, gapless structure formed from a single piece of an optically transmissive material. In other words, lenses 208 may be made an integral part of the respective light guide (sheet 10) and may cumulatively form a structured light guiding surface.

According to one embodiment, the rounded ridges forming lenses 208 may be formed in a separate sheet of a highly optically transmissive polymeric material (e.g., PMMA) which can be bonded to sheet 10 to form a monolithic, integral sheet having structured light-guiding surface 12. A thin layer of an optically clear adhesive or encapsulant may be used for bonding such lens-array sheet to base sheet 10. According to one embodiment, the thin layer of an optically clear adhesive or encapsulant may be refractive index matched with the material of sheet 10 and/or lens array. According to one embodiment, the thin layer of an optically clear adhesive or encapsulant may have a lower refractive index than the material of sheet 10 and may form a cladding layer. According to one embodiment, the material of the lens array may have a lower refractive index than the material of sheet 10. According to one embodiment, the lens array may be separated from base sheet 10 by a thin layer of air or highly transparent material such that there is no optical contact or limited optical contact between the lens array and base sheet 10. According to one embodiment, the lens array may be disposed in physical contact with base sheet 10 such that there is no optical contact or limited optical contact between the lens array and base sheet 10.

Lenticular lenses 208 extend parallel to each other and parallel to the Y axis such that each of lenticular lenses 208 extends perpendicular to edge surfaces 13 and 14. Lenses 208 may be separated by spacing areas 215. According to one embodiment, spacing areas 215 may be exemplified by smooth and planar portions of surface 12 between lenses 208. The respective smooth and planar portions of surface 212 may extend substantially parallel to the XY plane. According to one embodiment, spacing areas 215 may include other surface structures such as rounded ridges or linear cylindrical lenses each having a smaller width than lenses 208 and extending parallel to lenses 208. According to one embodiment, spacing areas 215 may include linear microprisms or prismatic corrugations formed in surface 12 and extending parallel to lenses 208.

According to one embodiment, the transverse width of spacing areas 215 is approximately equal to the transverse width of lenses 208 (as measured along the X axis). According to one embodiment, the width of spacing areas 215 is less than the width of lenses 208 by about two times or more. According to one embodiment, the width of spacing areas 215 is greater than the width of lenses 208 by about two times or more. According to one embodiment, the width of spacing areas 215 is much less than the width of lenses 208. The width of spacing areas 215 can also be made virtually zero. In other words, lenses 208 can be distributed across surface 12 with a high packing density and may also be contacting each other or positioned in an immediate proximity to each other.

Referring to FIG. 23 and FIG. 24, LEDs 2' incorporated into a first array are coupled to edge surfaces 23 and 24. LEDs 2 incorporated into a second array are coupled to edge surfaces 25 and 26. An additional, third array of LEDs 202 is provided. LEDs 202 are positioned adjacent to edge surfaces 13 and optically coupled to base sheet 10. Similarly, the third array of LEDs 202 may include additional LEDs 202 that are coupled to opposite edge surface 14 of sheet 10.

Linear cylindrical lenses 208 extend along the light propagation path with respect to the light injected into sheet 10 through edge surfaces 13 and/or 14. Lenses 208 can be made integral to sheet 10 and can be configured reflect the light guided within sheet 10 by means of TIR. Lenses 208 should normally have smooth surfaces polished to a high gloss and preferably to optical-quality surface finish. An root mean square surface roughness parameter of lenses 208 should preferably be less than 20 nanometers and more preferably 10 nanometers or less.

Accordingly, in operation, light emitted by LEDs 2 and/or LEDs 202 can bounce from lenses 208 and opposing surfaces 11 and 21 of stepped light guide 800 and can be guided along the Y axis until it is extracted by respective light extracting features 8 and/or 9. Suitable configurations of lenses 208 as well as related methods of forming and using such lenses with planar light guides (waveguides) are disclosed, for example, in the '826 and '007 Patents.

According to one embodiment, lenses 208 may be configured to assist in mixing light emitted by LEDs 202 within stepped light guide 800. In this case, the focal length of the lenses may be selected to be significantly shorter than the thickness of sheet 10 or at least shorter than the combined thickness of sheets 10 and 20. According to different embodiments, the focal distance may be less or equal to one third of the thickness of sheet 10, less or equal to one-half of the thickness of sheet 10, or less or equal to the thickness of sheet 10. At the same time, it may be preferred that the focal distance is greater than one tenth of the thickness of sheet 10.

According to some embodiments, lenses 208 may be configured to assist in smoothing out the irregularities of the luminance of surface 12 that may be associated with individual LEDs 202, patterns of discrete light extraction features 8 and/or 9, or boundaries of sheets 20. The criticality of using lenses 208 and configuring them to maximize the light diffusion effect may be particularly consistent with the embodiments of system 900 where the light extraction patterns, the transitions between sheets 20 or the emission from individual LEDs 2, 2', 2''', 2'''', or 2''''' would otherwise be perceptible by a human observer (e.g., when system 900 is used within an lighting fixture or a backlight unit of an electronic display, according to at least some embodiments of the present invention).

According to one embodiment, the shape of lenses 208 may be selected to provide a prescribed collimation of the emitted beam. Various examples of light collimating configurations of light guides employing linear cylindrical lenses or point-focus lenses and consistent with the embodiments described herein are disclosed, for example, in the '007 and '826 Patents. By way of a non-limiting example, FIG. 23A of the '007 Patent illustrates light distribution and collimation using lenticular (linear cylindrical) lenses that extend parallel to a light input edge of a planar light guide. In a further non-limiting example, FIG. 26 of the '826 Patent illustrate light distribution and collimation using lenticular lenses that extend perpendicular to a light input edge of a planar light guide and are formed directly in a light-emitting surface of the light guide. The respective teachings may be applied, without limitations, for configuring lenses 208 formed in light guiding base sheet 10.

The degree of light collimation and/or mixing achieved using lenses 208 may be controlled, for example, by a radius of curvature R of lenses 208 (in a transverse cross section that is parallel to the XZ axis). Additionally, it can be controlled by the distance between lenses 208 and light extraction features 8 and/or 9. Yet additionally, it can be controlled by the relative sizes of lenses 208 and light extraction features 8 and/or 9 (e.g., by a ratio between a transversal width of lens 208 and the size of light extraction feature 8 or 9). According to one embodiment, radius of curvature R of at least a substantial portion of the surface of each lens 208 may be defined by a lens maker's equation discussed in the '826 Patent.

According to one embodiment, radius of curvature R of at least a substantial portion of the surface of each lens 208 may be bounded by the following relationship:

$$TC \approx \frac{nR}{n-1},$$

where n is the index of refraction of the material of sheet 10 and or 20, and TC is a dimensional parameter associated with the thickness of either one or both sheets 10 and 20.

According to one embodiment, TC is about equal to the thickness of sheet 10. According to one embodiment, TC is about equal to the thickness of sheet 20. According to one embodiment, TC is about equal to the combined thickness of sheets 10 and 20 or the total thickness of stepped light guide 800. According to one embodiment, TC is approximately equal to 0.5 times the thickness of sheet 10. According to one embodiment, TC is approximately equal to 0.3 times the thickness of sheet 10. According to one embodiment, TC is greater than 0.1 times the thickness of sheet 10 and less than one-half the thickness of sheet 10. According to one embodiment, TC is greater than 0.1 times the combined thickness of sheets 10 and 20 and less than one-half the combined thickness of sheets 10 and 20.

FIG. 25 schematically illustrates an embodiment of stepped light guide illumination system 900 which includes a parallel array of optical couplers 88 that are configured to assist in coupling light emitted by LEDs 202 into light guide 800.

Optical couplers 88 are exemplified by tapered ridges that extend parallel to the Y axis (perpendicular to edge surface 13). Such ridges may be formed from the same material as sheet 10. For example, they can be molded as three-dimensional surface features directly in surface 212 at the time of making sheet 10. All of the ridges can be formed at once and together with lenses 208. Alternatively, the ridges may also be overmolded on top of surface 212 and can be made from a different material that has high optical transmittance, e.g., optical-grade PMMA (acrylic), polycarbonate or low-iron glass. In a further alternative, optical couplers 88 may be formed separately from sheet 10 and then bonded to surface 12, e.g., using a UV-curable optical adhesive.

Each optical coupler 88 has a light input face 89 that extends perpendicular to surface 12 and is disposed flush (i.e., in the same plane or substantially the same plane) with edge surface 13. Surface 12 has a light input portion that is smooth and substantially free from lenses 208 and a light emitting portion that is microstructured and includes lenticular lenses 208. Optical couplers 88 are formed in the light input portion of surface 12. According to one embodiment, optical couplers 88 may be formed in the portions of surface 12 that have lenses 208.

According to a preferred embodiment, sheet 10 has a thickness that is lower than a height of each LED 202 (where the height is measured along the Z axis). Furthermore, the thickness of sheet 10 is preferable equal to or less than the size of a light emitting aperture of LEDs 202 (as measured along the Z axis). Each optical coupler 88 has a maximum height (measured along the Z axis at light input face 89) sufficient to accommodate the size of the light emitting aperture of an individual LED 202 measured along the Z axis. According to one embodiment, the sum of the thickness of sheet 10 and the maximum height of optical coupler 88 is at least equal to or greater than the size of the light emitting aperture of LEDs 202. According to different embodiments, the sum of the thickness of sheet 10 and the maximum height of optical coupler 88 exceeds the size of the light emitting aperture of LEDs 202 along the Z axis by at least 10%, at least 20%, and at least 30%, but no more than by 50%.

Each LED 202 is disposed in registration or alignment with respect to at least one optical coupler 88 and is positioned in an immediate proximity to edge surface 13 and light input face 89 such that to minimize light spillage. According to one embodiment, multiple LEDs 202 may be coupled to a single optical coupler 88.

The spacing between side edges of individual optical couplers 88 may be selected such that the optical cross-talk between adjacent optical couplers 88 is minimized. In other words, the spacing should be sufficient to allow light that exits from one coupler 88 to propagate within sheet 10 away from edge surface 13 without entering into an adjacent coupler 88. The spacing should also preferably be wide enough to prevent a cone of light emitted by an individual LED 202 that is coupled to a particular optical coupler 88 to encompass adjacent optical couplers 88. According to one embodiment, a minimum spacing between optical couplers 88 is equal to or greater than thickness $T_1$ of sheet 10. According to some embodiments, such minimum spacing is equal to or greater than $T_1$ times 1.5, equal to or greater than $T_1$ times 2, equal to or greater than $T_1$ times 2.5, and equal to or greater than $T_1$ times 3.

In operation, a light ray R55 illustrates an exemplary light path in stepped light guide illumination system 900. Light ray R55 emitted by one of LEDs 202 enters into optical coupler 88 that is aligned with the respective LED 202. Light ray R55 enters into the optical coupler through face 89.

Light ray R55 further propagates within the space defined by the body of optical coupler 88 and a portion of sheet 10 below the coupler undergoing multiple bounces from the walls of optical coupler 88 and surface 11 until it exits from this space and further propagates within a portion of the body of sheet 10 that is free from optical couplers 88.

Light ray R55 is further guided within sheet 10 in response to optical transmission and TIR. On its path, light ray R55 may encounter one or more sheets 20 and can similarly propagate within such sheets in response to optical transmission and TIR. TIR may occur at any or all of surfaces 11, 12, and 21. TIR may also occur at edges of stepped light guide 800.

Both the spacing areas 215 of surface 12 and lenses 208 formed in such surface are preferably configured to reflect light by means of TIR. Light ray R55 further encounters one of light extraction features 8 or 9 (not shown for clarity) and is emitted from surface 12 while propagating through one of lenticular lens 208. Lenticular lens 208 may additionally bend the propagation path of light ray R55 and can provide, for example, enhanced light diffusion or collimation.

Exemplary configurations of highly elongated optical couplers 88 and light-guiding sheet 10 employing such optical couplers, as well as the principles of LED coupling to such couplers and light guiding sheet, can include those of face-lit waveguide illumination systems, for example, as described in the '666 Publication.

FIG. 26 schematically illustrates an embodiment of stepped light guide illumination system 900 which is similar to that of FIG. 25 except that LEDs 202 and optical couplers 88 have different configurations, dimensions, and arrangement, and also provide for a somewhat different mode of light coupling.

Referring to FIG. 26, each LED 202 has a highly elongated configuration, with its length along the X axis being much greater than the other two dimensions (e.g., by 2 times, 3 times, 3.5 times or 4 times or more). Accordingly, each optical coupler 88 is shaped in the form of a wide wedge such that its light input face 89 extends along the same or a greater distance along the X axis as the length of individual LED 202. A transverse width $W_{88}$ of each optical coupler 88 (as measured along the Y axis) is much shorter than its length $L_{88}$ along the X axis. According to different embodiments, $L_{88}$ can be greater than transverse width $W_{88}$ by 2 times, 3 times, 4 times, 5 times, and 6 times or more. According to one embodiment, $L_{88}$ can be greater than 2 times $W_{88}$ and less or equal to 10 times $W_{88}$.

Transverse width $W_{88}$ can be further constrained by a requirement to minimize secondary interactions of light rays with a top wall of optical coupler 88 and thus minimize premature light leakage from light guide 800. The criticality of appropriate dimensioning of optical couplers in view of minimizing light spillage is disclosed, for example, in par. [0097]-[0104] of the '361 Publication. A critical width $W_{max}$ of optical coupler 88 (as measured along the Y axis) may be defined by the following expression:

$$W_{max} = \frac{2d}{\sqrt{n^2-1}},$$

where d is the thickness of sheet 10 and n is the refractive index of the material of sheet 10. For example, for polycarbonate (n=1.58, $W_{max}$=1.63 times d), and for PMMA (n=1.49, $W_{max}$=1.81 times d).

According to several embodiments, the transversal width $W_{88}$ of each optical coupler 88 (along the Y axis) can be approximately equal to $W_{max}$, less than 1.5 times $W_{max}$, less than 1.3 times $W_{max}$, less than 0.8 times $W_{max}$, and less than 0.5 times $W_{max}$. According to at least one embodiment, the transverse width of each optical coupler 88 may be further constrained to be greater than 0.1 times $W_{max}$ and more preferably greater than 0.3 times $W_{max}$. According to at least one embodiment, the transverse width of each optical coupler 88 may be greater or equal to 0.75 times $W_{max}$ and less than or equal to 1.25 times $W_{max}$.

According to preferred embodiments, a taper angle of optical coupler 88 in the YZ plane should not exceed 15 degrees. The taper angle may be defined at a dihedral angle between the top surface of optical coupler 88 and a bottom surface of the coupler (or surface 12). Suitable exemplary ranges for the taper angle may include 3 to 6 degrees, 7 to 10 degrees, and 10 to 15 degrees. According to different exemplary embodiments, the taper angle may be 6 degrees, 8 degrees, 10 degrees, and 12 degrees. According to one embodiment, each optical coupler 88 may further have a taper in the orthogonal XY plane.

As illustrated in FIG. 27, schematically depicting a cross-section of a light input portion of the embodiment shown in FIG. 26, a height $T_{88}$ of wedge-shaped optical coupler 88 (as measured along the Z axis) is selected to accommodate a height $H_{202}$ of LED 202 (as measured along the same axis), such that the combined thickness of the respective light receiving end of sheet 10 is at least equal to or preferably greater than height $H_{202}$. According to one embodiment, height $H_{202}$ may refer to a total height of the respective LED package. According to one embodiment, height $H_{202}$ may refer to the total size of a light emitting aperture of the respective LED package (as measured along the Z axis).

FIG. 28 schematically illustrates an embodiment in which wedge-shaped optical coupler 88 is formed by a tapered light input end of sheet 10 where the thickness of sheet 10 at edge surface 13 is greater than nominal thickness $T_1$ of the sheet. Optical coupler 88 of FIG. 28 forms an integral part of sheet 10 such that light input edge surface 13 is also light input face 89 of optical coupler 88.

Optical couplers 88 may be formed in either one of surfaces 11 and 12. Optical couplers 88 may also be formed in both surfaces 11 and 12. According to one embodiment, each optical coupler 88 may have a symmetrical tapered configuration (in a cross-section parallel to the YZ plane), forming identical opposing protrusions in surfaces 11 and 12, for example, as illustrated in FIG. 29 and FIG. 30. The above described limitations regarding the dimensioning and positioning of asymmetrical (referring to a cross-section parallel to the YZ plane) optical couplers 88 may be equally applied to the dimensioning and positioning of such symmetrical configurations of the couplers (referring to the same cross-section).

A total maximum thickness $T_{max}$ of sheet 10 at the light input edge (i.e., at light input face 89 of optical coupler 88) may be defined as the sum of nominal thickness $T_1$ of sheet 10 and the combined thickness added by optical coupler(s) 88. For example, $T_{max}=T_1+T_{88}$ for the embodiment of FIG. 27 and $T_{max}=T_1+2T_{88}$ for the embodiment of FIG. 30. It may be appreciated that many applications may require maximizing light coupling efficiency. It can be shown that the light coupling efficiency may be maximized when certain relationships between the geometrical parameters of sheet 10 and optical couplers 88 are met.

According to one embodiment, optical coupler is formed in only one of surfaces 11 and 12, $T_1$ is about 0.75 times $T_{max}$, and $T_{88}$ is about 0.25 times $T_{max}$. According to one embodiment, optical coupler 88 is formed in both surfaces 11 and 11 (e.g., as illustrated in FIG. 30), $T_1$ is about 0.75 times $T_{max}$, and $T_{88}$ is about 0.125 times $T_{max}$. According to one embodiment, $T_{88}$ is equal or greater than 0.25 times $T_{max}$ and equal to or less than 0.5 times $T_{max}$. According to an aspect of the embodiments illustrated in FIG. 27, FIG. 29 and FIG. 30, the entire tapered portion of sheet 10 configured for light input from individual LED 202 or a compact cluster LEDs 202 of may be regarded as an individual optical coupler 88 and the above-described limitations may be applied to configuring and dimensioning such tapered light input portion of sheet 10.

According to some embodiments, each sheet 20 may be configured to include optical couplers on one, two, three or all four of its edges. Such optical couplers may have the same or similar configurations, dimensions and operation described above in reference to optical couplers 88 and edge surface 13 of sheet 10. According to one embodiment, both sheets 10 and 20 may be provided with optical couplers 88 on edges that are illuminated with LEDs.

According to one embodiment, stepped light guide 800 can be made from PMMA (acrylic) and the outside medium can be air. Other suitable materials for making stepped light guide 800 include but are not limited to polycarbonate, glass, polystyrene, silicones, and any other solid dielectric materials that provide sufficient optical transmittance for guiding light along a prevalent plane of the stepped light guide.

According to one embodiment, linear cylindrical lenses 208 may be replaced by parallel ridges formed in surface 212 and having any other suitable shape. The parallel ridges may be rounded, e.g., lenticular lens-like. The parallel ridges may also be prismatic, e.g., formed by a parallel array of triangular microprisms. Similarly to lenses 208, such parallel ridges may extend perpendicular to edge surfaces 13 and 14 or perpendicular to edge surfaces 15 and 16, and may be configured to reflect/guide light by means or TIR away from the respective edges.

FIG. 31 schematically depicts a portion of a light input edge of sheet 10 where an array of edge surface corrugations 330 is formed in edge surface 13 and an array of surface corrugations 331 is formed in light input face 89 of each optical coupler 88. Surface corrugations 330 and 331 longitudinally extend parallel to the Z axis and are configured to disperse light entering into sheet 10 in the XY plane such that the cones of light from individual LEDs 202 can be spread over a wider angular range in that plane compared to the case of planar edge surface 13 and light input faces 89.

According to one embodiment, all surface corrugations 330 and 331 may have the same transversal shape in a cross-section (in a plane parallel to the XY plane) and can have the same spacing, although their lengths along the Z axis can be different (due to the different thickness of sheet 10 and couplers 88). According to one embodiment, surface corrugations 330 and 331 can have different cross-sectional shapes and/or spacing.

According to one embodiment, stepped light guide illumination system 900 may be made sufficiently thin to enable easy flexing and conforming to various prescribed shapes. Flexible light guide illumination system 900 may be formed by flexible stepped light guide 800 and a flexible PCB (e.g., PCB 96) carrying a two-dimensional array of LEDs 2. Flexible stepped light guide 800 may be formed by sufficiently thin and flexible sheets 10 and 20 so that the overall thickness of stepped light guide 800 is about equal to or below 3 mm, more preferably equal to or below 2 mm, more preferably equal to or below 1.5 mm, and even more preferably equal to or below 1 mm. This may be possible, for example, with the use of low-profile side-emitting LEDs having light emitting apertures between 0.1 mm and 0.6 mm in size (at least in a dimension than corresponds to the Z axis in the preceding Figures) and thicknesses of sheets 10 and 20 in the 0.1-1.5 mm range.

According to one embodiment, flexible stepped light guide 800 is configured or adapted for being retained in a bent or curved configuration (e.g., form a backlight unit of a curved LCD display). According to one embodiment, such light guide 800 may include lenses 208 that extend perpendicular to a prevalent bend direction or plane. According to one embodiment, such light guide 800 may include lenses 208 that extend parallel to a prevalent bend direction or plane.

According to one embodiment, lenses 208 may be replaced by point-focus lenses, for example, such as those described in the '007 Patent. The point-focus lenses may be dome-shaped (e.g., spherical or elliptical) or may be formed by Fresnel microstructures and configured as small-size Fresnel lenses. According to one embodiment, point-focus lenses 208 may be disposed in registration or alignment with at least some of light extraction features 8 and may further be configured to have a focal length approximating thickness $T_1$ of sheet 10, thickness $T_2$ of sheet 20 or a combined thickness $T_1+T_2$ such that two-dimensionally collimated beams of light may be formed when light guide 800 is illuminated by the respective edge-coupled light sources.

Flexible stepped light guide 800 may include as many sheets 20 (and as many edge-coupled LEDs) as needed to form a one-dimensional or a two-dimensional array of sections 54 and 55. It may be appreciated that stepped light guide illumination system 900 may be configured to accommodate a large two-dimensional array of LED sources and may still maintain the low prescribed thickness regardless of the overall size of the. As discussed above, stepped light guide 800 may include a repeating pattern of sections 54 and 55 and also include a repeating pattern of light extraction features 8 and 9 corresponding to such sections. Accordingly, flexible stepped light guide 800 may be manufactured in the form of a large, continuous sheet of a variable thickness, including a large number of sections 54 and 55 with the associated light extraction features. According to one embodiment, such continuous large-area sheet may then be cut into smaller sheets, depending on the application. For example, it may be cut along a midline of one of the sections 55, thus producing two smaller-size stepped light guides 800 having the same basic structure, thickness and operation.

According to one embodiment, flexible stepped light guide illumination system 900 is provided with light extraction features 8 and 9 that are printed on respective surfaces 11 and 21, where the ink or paint (e.g., a UV-curable white ink) used to print light extraction features 8 and 9 (using ink jet printing or screen printing, for example) may include light scattering particles immersed into a polymeric resin which remains flexible and stretchable without cracking even when fully cured. For example, according to different implementations, the fully cured ink or paint may have elongation at break of at least 25%, at least 50%, at least 100%, and at least 150%.

According to one embodiment, light extraction 8 and/or 9 may be formed in surface 11 of sheet 10 in the areas where sheets 20 are attached to sheet 10, e.g., in sections 54 of FIG. 1 or FIG. 23 or in sections 52 of FIG. 13. FIG. 32 schematically illustrates an exemplary embodiment of this type in which a plurality of light extraction features 8' is formed in section 52 of surface 11 of sheet 10. Light extraction features 8' may be of the same type as light extraction features 8 and/or 9. Alternatively, light extraction features 8' may differ from light extraction features 8 and/or 9, for example, by the shape, composition or a method of making. According to one embodiment, substantially the entire area of surface 11 may be covered with light extraction features 8, 8' and/or 9. For example, the pattern of light extraction features 8 and 9 shown in FIG. 15 may be formed in surface 11.

Further details of operation of illumination systems shown in the drawing figures as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Any numerical range recited herein is intended to include all sub-ranges subsumed therein. For example, a range of 1 to 10 is intended to include all sub-ranges between and including the recited minimum value of 1 and the recited maximum value of 10, that is, having a minimum value equal to or greater than 1 and a maximum value of equal to or less than 10, such as, for example, 3 to 6 or 2.5 to 8.5. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a). Also, unless otherwise indicated, all numerical parameters are to be understood as being prefaced and modified in all instances by the term "about", in which the numerical parameters possess the inherent variability characteristic of the underlying measurement techniques used to determine the numerical value of the parameter.

What is claimed is:

1. An illumination system, comprising:
    a planar sheet of an optically transmissive material configured for guiding light using total internal reflection and having a first broad-area surface and an opposing second broad-area surface extending parallel to the first broad-area surface;
    a plurality of parallel rectangular channels formed in the planar sheet;
    a first printed circuit board positioned along the second broad-area surface;
    a first plurality of side-emitting LEDs mounted on the first printed circuit board and each having a bottom surface facing the first printed circuit board, a top surface facing the planar sheet and a light emitting side surface extending between the top and bottom broad-area surfaces generally perpendicular to a plane of the first printed circuit board; and
    a two-dimensional pattern of light extraction features formed in the second broad-area surface with a variable spacing,
    wherein each of the plurality of side-emitting LEDs is positioned within a first one of the plurality of parallel rectangular channels and optically coupled to a side wall of the first one of the parallel rectangular channels, wherein a density of the light extraction features within the two-dimensional pattern at a first location of the planar sheet progressively increases with a distance from the side wall, wherein a width of the printed circuit board is greater than a width of the first one of the parallel rectangular channels, and wherein both the first and second broad-area surfaces are configured for outputting light from the planar sheet.

2. An illumination system as recited in claim 1, wherein the planar sheet is flexible and adapted for being retained in a bent or curved configuration.

3. An illumination system as recited in claim 1, wherein a density of the light extraction features within the two-dimensional pattern at one or more locations of the planar sheet progressively decreases with a distance from the side wall.

4. An illumination system as recited in claim 1, wherein the two-dimensional pattern comprises a plurality of areas having a lower density of the light extraction features alternating with a plurality of areas having a higher density of the light extraction features.

5. An illumination system as recited in claim 1, wherein the two-dimensional pattern comprises a plurality of alternating bands having different spatial densities of light extraction features and each extending parallel to the plurality of parallel rectangular channels.

6. An illumination system as recited in claim 1, comprising a sheet of a reflective material disposed within at least one of the plurality of parallel rectangular channels.

7. An illumination system as recited in claim 1, comprising a sheet of a reflective material attached or disposed in an immediate proximity to the second broad-area surface.

8. An illumination system as recited in claim 1, wherein at least a portion of the printed circuit board is located within one of the plurality of parallel rectangular channels.

9. An illumination system as recited in claim 1, comprising an optically transmissive light diffusing sheet approximately coextensive with the planar sheet and positioned adjacent or in a close proximity to the first broad-area surface.

10. An illumination system as recited in claim 1, comprising a brightness enhancement film approximately coextensive with the planar sheet and positioned on a side of the first broad-area surface of the planar sheet.

11. An illumination system as recited in claim 1, wherein the plurality of parallel rectangular channels is arranged into an ordered two-dimensional array having rows and columns.

12. An illumination system as recited in claim 1, comprising a plurality of linear cylindrical lenses formed in the first broad-area surface and longitudinally extending perpendicular to the plurality of parallel rectangular channels.

13. An illumination system as recited in claim 1, comprising a plurality of linear cylindrical lenses formed in the first broad-area surface and longitudinally extending perpendicular to the plurality of parallel rectangular channels, a brightness enhancement film approximately coextensive with the planar sheet, and a light diffusing sheet approximately coextensive with the planar sheet, wherein both the brightness enhancement film and the light diffusing sheet are approximately coextensive with the planar sheet and positioned on a side of the first broad-area surface of the planar sheet.

14. An illumination system as recited in claim 1, wherein a maximum thickness of the planar sheet is approximately equal to or less than 3 mm.

15. An illumination system as recited in claim 1, wherein a maximum thickness of the planar sheet is ten millimeters or less.

16. An illumination system as recited in claim 1, wherein an individual one of the plurality of parallel rectangular channels defines a first wall and an opposing second wall, wherein a light emitting aperture of at least one of the side-emitting LEDs is oriented towards the first wall, and wherein a light emitting aperture of at least one of the side-emitting LEDs is oriented towards the second wall.

17. An illumination system as recited in claim 1, wherein an individual one of the plurality of parallel rectangular channels defines a first wall and an opposing second wall, wherein the plurality of side-emitting LEDs includes a linear LED array in which individual side-emitting LEDs facing the first wall are alternating with individual LEDs facing the second wall.

18. An illumination system, comprising:
   a planar sheet of an optically transmissive material configured for guiding light using total internal reflection and having a first broad-area surface and an opposing second broad-area surface extending parallel to the first broad-area surface;
   a plurality of parallel rectangular channels formed in the planar sheet;
   a first printed circuit board positioned along the second broad-area surface;
   a first plurality of side-emitting LEDs mounted on the first printed circuit board and each having a bottom surface facing the first printed circuit board, a top surface facing the planar sheet and a light emitting side surface extending between the top and bottom broad-area surfaces generally perpendicular to a plane of the first printed circuit board; and
   a two-dimensional pattern of light extraction features formed in the second broad-area surface with a variable spacing,
   wherein each of the plurality of side-emitting LEDs is positioned within a first one of the plurality of parallel rectangular channels and optically coupled to a side wall of the first one of the parallel rectangular channels, wherein the two-dimensional pattern comprises a plurality of areas having a lower density of the light extraction features alternating with a plurality of areas having a higher density of the light extraction features, wherein a width of the printed circuit board is greater than a width of the first one of the parallel rectangular channels, and wherein both the first and second broad-area surfaces are configured for outputting light from the planar sheet.

19. An illumination system as recited in claim 18, wherein at least a portion of the printed circuit board is located within one of the plurality of parallel rectangular channels.

20. An illumination system as recited in claim 18, wherein a density of the light extraction features within the two-dimensional pattern at a first location of the planar sheet progressively increases with a distance from the side wall.

* * * * *